(12) United States Patent
Fields et al.

(10) Patent No.: US 12,499,496 B2
(45) Date of Patent: Dec. 16, 2025

(54) SYSTEMS AND METHODS FOR MARKING VIRTUAL OBJECTS

(71) Applicant: STATE FARM MUTUAL AUTOMOBILE INSURANCE COMPANY, Bloomington, IL (US)

(72) Inventors: Brian Fields, Phoenix, AZ (US); Ellakate LeFebre, Mesa, AZ (US); Anthony Welcome, Mesa, AZ (US); Steve Amancha, Tempe, AZ (US); Jose Ivan Gutierrez, Laveen, AZ (US)

(73) Assignee: STATE FARM MUTUAL AUTOMOBILE INSURANCE COMPANY, Bloomington, IL (US)

(*) Notice: Subject to any disclaimer, the term of this patent is extended or adjusted under 35 U.S.C. 154(b) by 192 days.

(21) Appl. No.: 18/238,302

(22) Filed: Aug. 25, 2023

(65) Prior Publication Data
US 2024/0153022 A1     May 9, 2024

Related U.S. Application Data

(60) Provisional application No. 63/430,708, filed on Dec. 7, 2022, provisional application No. 63/382,274, filed on Nov. 3, 2022.

(51) Int. Cl.
*G06Q 30/00* (2023.01)
*G06Q 50/18* (2012.01)
(52) U.S. Cl.
CPC .................................. *G06Q 50/18* (2013.01)
(58) Field of Classification Search
None
See application file for complete search history.

(56) References Cited

U.S. PATENT DOCUMENTS

2004/0267694 A1* 12/2004 Sakai ...................... G06Q 10/08
2007/0211047 A1* 9/2007 Doan ...................... A63F 13/12
                                                                345/419

(Continued)

OTHER PUBLICATIONS

A reconfigurable interactive interface for controlling robotic origami in virtual environments. By: Huang, Jian-Lin; Zhakypov, Zhenishbek; Sonar, Harshal; +1 more In: International Journal of Robotics Research, May 2018 Applied Science & Technology Source. (Year: 2018).*

(Continued)

*Primary Examiner* — Matthew T Sittner
(74) *Attorney, Agent, or Firm* — MARSHALL, GERSTEIN & BORUN LLP

(57) ABSTRACT

Techniques are described herein for marking virtual objects. An exemplary system includes one or more processors; and a non-transitory computer-readable medium coupled to the one or more processors and storing instructions thereon. The instructions, when executed by the one or more processors, cause the one or more processors to: (1) receive a transaction listing from a first entity, the transaction listing including (i) a digital asset that is associated with a virtual object in a virtual environment and (ii) a status of the digital asset indicating an active association with the first entity, (2) generate a transaction based upon the transaction listing, the transaction including an indication of the virtual object, (3) record the transaction in a distributed ledger, and (4) responsive to recording the transaction in the distributed ledger, cause the status of the digital asset to be displayed when the virtual object is viewed in the virtual environment.

16 Claims, 10 Drawing Sheets

(56) References Cited

U.S. PATENT DOCUMENTS

| | | | |
|---|---|---|---|
| 2010/0269053 A1* | 10/2010 | Lingafelt | A63F 13/70 |
| | | | 709/224 |
| 2015/0283460 A1* | 10/2015 | Huang | A63F 13/00 |
| | | | 345/158 |
| 2018/0150982 A1* | 5/2018 | Lee | H04L 63/123 |
| 2019/0303892 A1* | 10/2019 | Yantis | G06Q 20/3825 |
| 2020/0175764 A1* | 6/2020 | Romea | G06T 19/006 |
| 2020/0384351 A1* | 12/2020 | Asano | G06F 3/0481 |
| 2023/0298008 A1* | 9/2023 | Sarin | H04L 9/50 |
| | | | 705/69 |
| 2023/0316439 A1* | 10/2023 | Slavin | H04L 9/50 |
| | | | 705/316 |
| 2023/0326145 A1* | 10/2023 | Plotkin | G06T 19/006 |
| | | | 711/206 |
| 2023/0385791 A1* | 11/2023 | Ayyagari | G06Q 30/0641 |
| 2024/0211552 A1* | 6/2024 | Li | G06F 21/44 |

OTHER PUBLICATIONS

Design and implementation of a container-based virtual client architecture for interactive digital signage systems. By: Park, Youngki; Yang, Hyunsik; Dinh, Thanh; +1 more In: International Journal of Distributed Sensor Networks, Jul. 2017. (Year: 2017).*

* cited by examiner

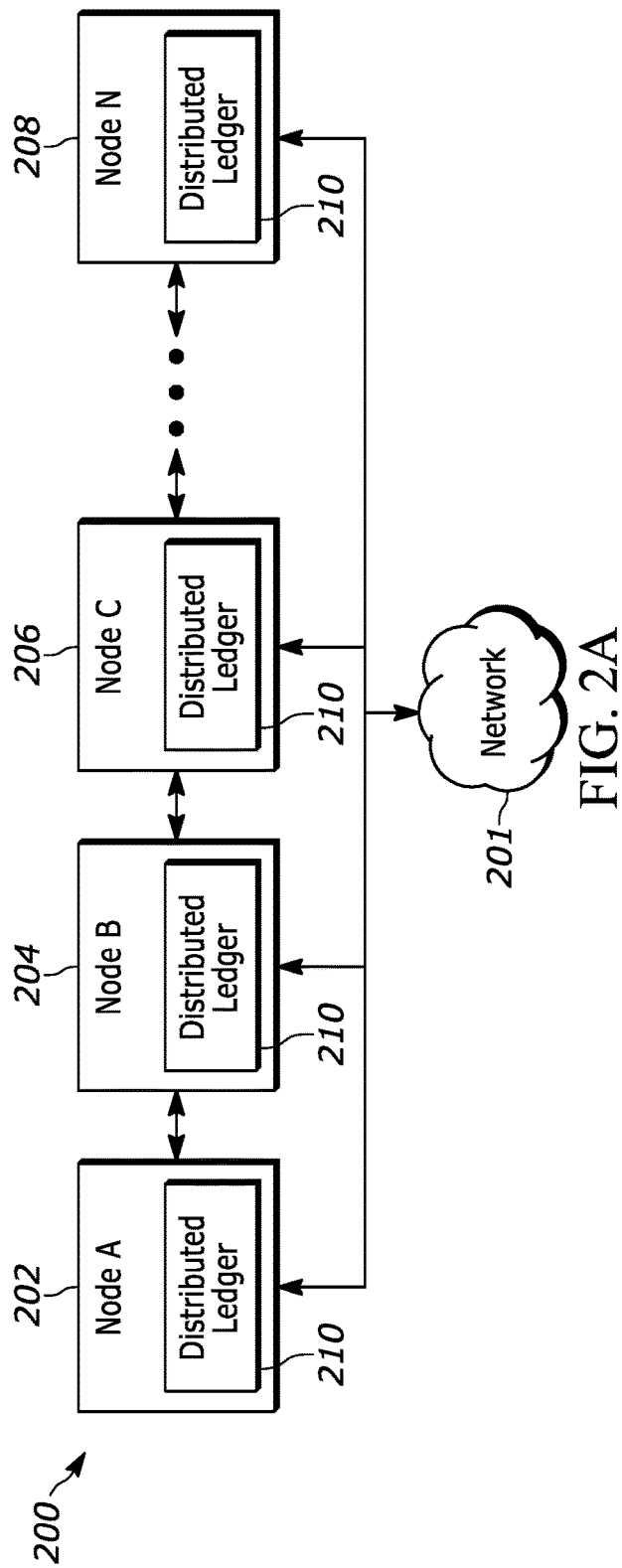
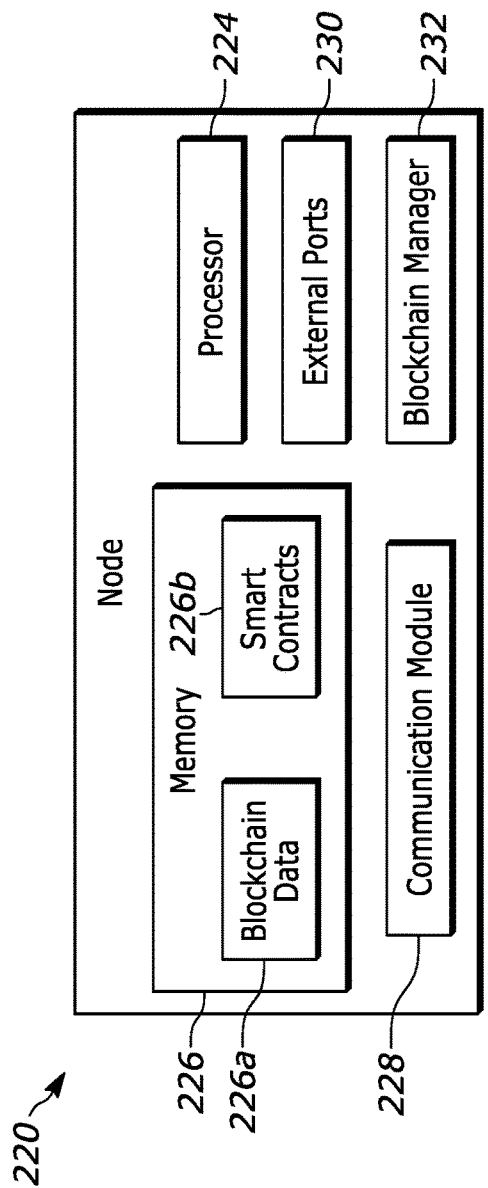

Collection (Add/Remove):
+ -

522

Genre: Vehicles
Status: Active
Name: Light Grey 2015 [Make A][Model A] In Excellent Condition.

Detailed Description: Light Gray 2015 [Make A] [Model A] In Excellent Condition. Only 15k Miles Driven. Maintenance Records Included. Vehicle Insurance By State Farm.

Previous Owners: 1
Other Information: Radiator, Tires, And All Four Brake Pads/Rotors Replaced Recently Other Files: Maintenance Records Hide | Show
Save | Terms

SYSTEMS AND METHODS FOR MARKING VIRTUAL OBJECTS

CROSS-REFERENCE TO RELATED APPLICATIONS

This application claims priority to U.S. Provisional Patent Application No. 63/430,708, entitled "Systems and Methods for Marking Virtual Objects," filed on Dec. 7, 2022, and to U.S. Provisional Patent Application No. 63/382,274, entitled "Systems and Methods for Marking Virtual Objects," filed on Nov. 3, 2022, the disclosures of which are hereby incorporated herein by reference.

TECHNICAL FIELD

The present disclosure relates generally to systems and methods to associate transactions in a distributed ledger with virtual objects. In particular, a system of the present disclosure provides an infrastructure including a distributed ledger utilized in a networked environment for marking virtual objects in a virtual environment.

BACKGROUND

Even in today's highly digitized and automated world, a high percentage of activities surrounding the identification, recordation, ownership, transfer, and management of property may be manual, inefficient, inaccurate, non-secure, and subject to costly errors, fraud, abuse, corruption, and theft. For example, many types of property and associated documents, such as titles and deeds, may be recorded in a variety of registries such as land registries, registrars, registers of deeds, departments and bureaus of motor vehicle registries, vessel registries, aircraft registries, patent and trademark offices, and so forth. These registries may additionally vary by jurisdiction including by country, state, province, district, sub-district, county, parish, and local municipalities (e.g., cities, villages, settlements, communes and the like).

Registries for vehicles may be generally fragmented. As a result, the various different tasks associated with these vehicles (e.g., title transfer, maintenance, insurance policies, etc.) may be registered on multiple, disconnected sources. In particular, vehicle registration/titles may be documented on one statewide or territory-wide registry, typically managed for vehicles by a state Department or Bureau of Motor Vehicles, or the like. Vehicle maintenance records may be maintained in registries of the one or more maintenance establishments (e.g., independent mechanic, dealership, etc.) that service the vehicle, and these maintenance registries may not be connected to the registration/title registries. Generally, though, many registries are electronic and fully digital; other registries may still be manual/paper-based; and yet other registries may be hybrids, with both digital records and paper records.

In jurisdictions where there are no registries, or where the registries are still manual, outright fraud and theft of property may not be difficult to commit. Even in jurisdictions where there are electronic registries, the registries may be based upon old "legacy systems" and outdated technology, such as, for example, state vehicle registries still existing in the archaic database technology called "DB2." Today's property registries may be manipulated, and, in some jurisdictions, there may be widespread abuse, fraud, corruption, and theft of property due to the inability to immutably record property ownership. Today's registries may also not utilize common infrastructure or standards, may be interoperable, fragile, brittle, difficult to modify or enhance, and/or expensive to maintain.

There are many possible mistakes and errors related to property titles, called title defects, such that if defects are still present and uncleared at the time of closing on the sale of a property, the transfer may become invalidated, and the buyer may even sue the seller. There may be many types of defects in titles, most of which are recorded defects introduced by human errors and which are herein referred to as Human Induced Defects (HIDs) which often may come in the form of mistyped names, transcription errors from paper-based documents and other non-automated sources, and missing property descriptions or incorrect legal descriptions. Title defects for personal property, such as vehicles, may include incorrect owner information (e.g., misspelled name, address), incorrect mileage, transcription errors, incorrect make, year model, or body style, incorrect lienholder(s), dates of lien(s), and lien release(s), and incorrect title number or incorrect Vehicle Identification Number (VIN). These title defects may block the transfer of a property and non-recorded defects may impact marketability of title to a property.

These issues may be further exasperated in virtual environments where real-world objects, such as vehicles, may be represented as virtual objects. For example, vehicles may be represented in a virtual environment (e.g., the Metaverse) as a virtual, three-dimensional (3D) object. Users within the virtual environment may interact with the virtual object representing the vehicle, and in certain instances, may obtain information corresponding to the real-world vehicle, such as make, model, and manufacturer suggested retail price (MSRP). However, the conventional systems that suffer from sluggish and inaccurate processes to record important information for real-world vehicles may similarly fail to update and/or otherwise integrate such information for the virtual object counterparts. Namely, conventional vehicle information recordation systems may generally fail to accurately or efficiently upload and/or update vehicle information for virtual objects representing real-world vehicles.

Taken together, these disadvantages of conventional systems create a substantial need for distributed ledger technology for marking virtual objects in a virtual environment.

SUMMARY

The present disclosure relates to, inter alia, Distributed Ledger Technology (DLT) which enables digital systems to record the characteristics of assets (e.g., vehicles), such as by minting tokens (also referenced herein as "digital assets") that may mark and/or otherwise be associated with virtual objects representing the assets in a virtual environment (e.g., Metaverse). These digital assets may correspond to and/or otherwise represent transactions and operations performed on or in association with the assets. As a result of the DLT, each of these digital assets and their associated details may be recorded in multiple places at the same time.

Unlike traditional databases, distributed ledgers have no central data store. The present disclosure relates to public ledgers, which are databases that are consensually shared and synchronized across multiple sites, institutions, or geographies. Such public ledgers are generally accessible by multiple people and systems, allow transactions to have public "witnesses," and participants at each node of the network can access the recordings shared across that network and can own identical copies of it. Any changes or additions made to the public ledger are reflected and copied to all participants. Such public ledgers are generally built in a standardized manner, such that two relatively independent public ledgers may communicate through cross-ledger interoperability. This cross-ledger implementation may be mainly represented by asset swaps and asset transfers, and through such an implementation, the limitations of a single ledger may be avoided.

Of course, the systems and methods of the present disclosure may additionally, or alternatively, include private ledgers, federated ledgers, and/or any other suitable types or combinations of ledgers. For example, the present disclosure may include private ledgers, which are permissioned distributed ledger systems where a single authority or organization has write-access to the network and control over read permissions can be public or restricted if a public readability feature is included in the private ledger. Similarly, the present disclosure may include federated ledgers, which are hybrid public/private ledgers that are similar to private ledgers, but which remove the sole organization influence from the network and enable multiple entities to use the network for their benefit as a hub where the multiple organizations can simultaneously exchange information and work, thereby enabling participants to "fast forward" any kind of work requiring multiple entities to participate or approve transactions.

Furthermore, the present disclosure relates to smart contracts which are computerized transaction protocols that execute terms of a contract and can be self-executing. In effect, a smart contract has a conditional or an "if" component (i.e., the "left hand side" of a rule), and also has an executable or "then" component (i.e., called the "right hand side" of a rule), with the difference being that a smart contract "watches" a distributed ledger for its conditions to be met at which point it "fires" or executes and immutably records its actions (contract) on the distributed ledger.

Techniques, systems, apparatuses, components, devices, and methods are disclosed for utilizing a distributed ledger, or blockchain, for managing asset (e.g., vehicle) records. For example, in an asset recordation system, a distributed ledger may be maintained by nodes. The distributed ledger architecture may include a public distributed ledger which is accessible by multiple people and systems, is permissionless, and allows transactions to have public "witnesses." Participants at each node of the network can access the recordings shared across that network and can own identical copies of it. Any changes or additions made to the public distributed ledger may be reflected and copied to all participants. The public distributed ledger may also obtain identification information for assets, which may uniquely identify an asset, and may be static and immutable in the public distributed ledger.

In certain embodiments, the distributed ledger architecture may also include a private distributed ledger where a single authority or organization has write-access to the network, and control over read permissions can be public or restricted if a public readability feature is included in the private ledger. If such read permissions are restricted, a user attempting to view the private ledger may need to enter a username (or user name) and password for authentication. For example, the private distributed ledger may obtain transaction-related documents for assets, such as contracts, title documents, deeds, mortgages, liens, lease documents, etc. The transaction-related documents may be dynamic and more memory intensive than the identification information and the ownership information. Moreover, the transaction-related documents may be more sensitive and private than the identification information and ownership information. Accordingly, the transaction-related documents may be managed by a single authority or organization rather than a public distributed ledger that may be accessed by any computing device.

In some embodiments, the distributed ledger architecture may also include a federated distributed ledger layer which requires nodes to receive permission to append data to the federated distributed ledger. Control over read permissions can be public or restricted if a public readability feature is included in the federated ledger. If such read permissions are restricted, a user attempting to view the federated ledger may need to enter a username and password for authentication. The federated distributed ledger may obtain ownership information for properties, such as transfers of ownership of a property from one owner to another, the dates of the transfers, the sale prices of the transfers, encumbrances on the property, etc. The ownership information may be dynamic and more memory intensive than the identification information. Moreover, the ownership information may be more sensitive and private than the identification information. Accordingly, the ownership information is managed by the federated distributed ledger layer rather than a public distributed ledger layer that can be accessed by any computing device.

Regardless, in instances where multiple distributed ledgers communicate to accurately record asset transactions, these multiple distributed ledgers may reference each other so that a user may obtain asset information for the same asset from each ledger. For example, a user may mint digital assets by recording transactions in the distributed ledger that include a representation of an asset (e.g., another digital asset or a real-world asset). These digital assets may be or include a non-fungible token (NFT) representing an asset on a first public ledger, where the NFT includes identification and ownership information for the asset. The NFT may be wrapped in wrapped NFTs on a second public distributed ledger, such that the first and second ledgers may reference each other through the NFT and wrapped NFTs referring to the NFT. In other embodiments, the multiple distributed ledgers may reference each other using any suitable combination of identifiers and/or cross-chain tools, such as asset identifiers, creator identifiers, chain identifiers, digital certificate of authenticity identifiers, owner identifiers, transaction identifiers, user identifiers, RDF identifiers, location identifiers, etc.

The systems and methods of the present disclosure may also include marking virtual objects in a virtual environment (e.g., Metaverse) with the minted digital assets. The digital assets may be visibly disposed proximate to a corresponding virtual object within the virtual environment, such that users in the virtual environment may view and/or otherwise interact with the digital assets in relation to the virtual object. For example, the virtual object may be a virtual, 3D representation of a real-world vehicle or other real-world object(s) (e.g., homes or houses, real property, personal articles or personal belongings, etc.), and the digital asset may be a NFT that represents a product or service (e.g., maintenance, dealerships, insurance, etc.) associated with the real-world vehicle or other real-world object(s). In particular, the NFT may have a corresponding status that indicates a recency or activity of the product or service associated with the real-world vehicle. For example, the NFT may represent a logo for an insurance provider (e.g., State Farm), and the status of the NFT may indicate an active/inactive status of vehicle insurance for the real-world vehicle. In another example, the NFT may represent a logo for a vehicle maintenance provider, and the status of the NFT may indicate a recency of maintenance/servicing performed on the real-world vehicle.

Further, the systems and methods of the present disclosure include users interacting with other users via digital tokens. For example, online digital identities, as implemented by use of digital tokens on a blockchain, may provide a single source of user authentication for a given user and reduce digital waste across networks. Such digital identities may be used in a variety of ways to identify respective users.

Namely, digital tokens may be associated with users where such digital tokens may be used to provide respective digital identities to authenticate a select group of users (e.g., fans) for the purpose transacting with, or associating users with, people (e.g., musicians) or entities (e.g., sports teams). Such digital tokens may provide access or privileges in either real-world or virtual environments, such as sporting events, concerts, in videogames, or in the Metaverse. In various embodiments, a user's digital token(s), and/or related public and private keys, may be used to identify and/or authenticate a user and server as a single source of authenticity and identification to a variety of entities, persons, and related systems.

One exemplary embodiment of the techniques of this disclosure is a computer system for marking virtual objects. The computer system may include one or more local or remote processors, transceivers, sensors, servers, memory units, mobile devices, wearables, smart glasses, augmented reality glasses, virtual reality headsets, or other electronic or electrical components. In one instance, the system may include one or more processors; and a non-transitory computer-readable medium coupled to the one or more processors and storing instructions thereon. When executed by the one or more processors, the instructions cause the one or more processors to: (1) receive a transaction listing from a first entity, the transaction listing including (i) a digital asset that is associated with a virtual object in a virtual environment and/or (ii) a status of the digital asset indicating an active association with the first entity; (2) generate a transaction based upon the transaction listing, the transaction including an indication of the virtual object; (3) record the transaction in a distributed ledger; and/or (4) responsive to recording the transaction in the distributed ledger, cause the status of the digital asset to be displayed when the virtual object is viewed in the virtual environment. The system may be configured to have additional, less, or alternate functionality, including that discussed elsewhere herein.

Another exemplary embodiment of the techniques of this disclosure is a computer-implemented method for marking virtual objects. The computer-implemented method may be implemented via one or more local or remote processors, transceivers, sensors, servers, memory units, mobile devices, wearables, smart glasses, augmented reality glasses, virtual reality headsets, or other electronic or electrical components. In one instance, the method may include (1) receiving, at one or more processors, a transaction listing from a first entity, the transaction listing including (i) a digital asset that is associated with a virtual object in a virtual environment and/or (ii) a status of the digital asset indicating an active association with the first entity; (2) generating, by the one or more processors, a transaction based upon the transaction listing, the transaction including an indication of the virtual object; (3) recording, by the one or more processors, the transaction in a distributed ledger; and/or (4) responsive to recording the transaction in the distributed ledger, causing, by the one or more processors, the status of the digital asset to be displayed when the virtual object is viewed in the virtual environment. The method may include additional, less, or alternate actions, including those discussed elsewhere herein.

Yet another exemplary embodiment of the techniques of this disclosure is a tangible, non-transitory computer-readable medium storing instructions for marking virtual objects. When executed by one or more processors of a computing device, the instructions may cause the computing device to: (1) receive a transaction listing from a first entity, the transaction listing including (i) a digital asset that is associated with a virtual object in a virtual environment and/or (ii) a status of the digital asset indicating an active association with the first entity; (2) generate a transaction based upon the transaction listing, the transaction including an indication of the virtual object; (3) record the transaction in a distributed ledger; and/or (4) responsive to recording the transaction in the distributed ledger, cause the status of the digital asset to be displayed when the virtual object is viewed in the virtual environment. The instructions may direct additional, less, or alternate functionality, including that discussed elsewhere herein.

Therefore, in accordance with the above, and with the disclosure herein, the present disclosure includes improvements in computer functionality or in improvements to other technologies at least because the present disclosure describes that, e.g., vehicle transaction and recording systems, may be improved or enhanced with the disclosed systems and methods for marking virtual objects in a virtual environment. That is, the present disclosure describes improvements in the functioning of vehicle transaction and recording systems itself or "any other technology or technical field" (e.g., vehicle transfer/maintenance field) because the disclosed systems and methods improve and enhance the operation of vehicle transaction and recording systems by introducing digital asset (e.g., NFT) minting and application to virtual objects through transaction generation and recordation using distributed ledgers in a manner that is unachievable using conventional systems and methods. This improves over the prior art at least because such conventional systems were error-prone, as they lack the ability for generating and/or recording such transactions.

Moreover, the present disclosure includes effecting a transformation or reduction of a particular article to a different state or thing, e.g., transforming or reducing the generation and/or recordation of vehicle transaction records from a non-optimal or error state to an optimal state.

Still further, the present disclosure includes specific features other than what is well-understood, routine, conventional activity in the field, or adding unconventional steps that demonstrate, in various embodiments, particular useful applications, e.g., generating a transaction based upon the transaction listing, the transaction including an indication of the virtual object; recording the transaction in a distributed ledger; and responsive to recording the transaction in the distributed ledger, causing the status of the digital asset to be displayed when the virtual object is viewed in the virtual environment.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects.

Accordingly, the drawings and description are to be regarded as illustrative in nature and not as restrictive.

Figure 1:
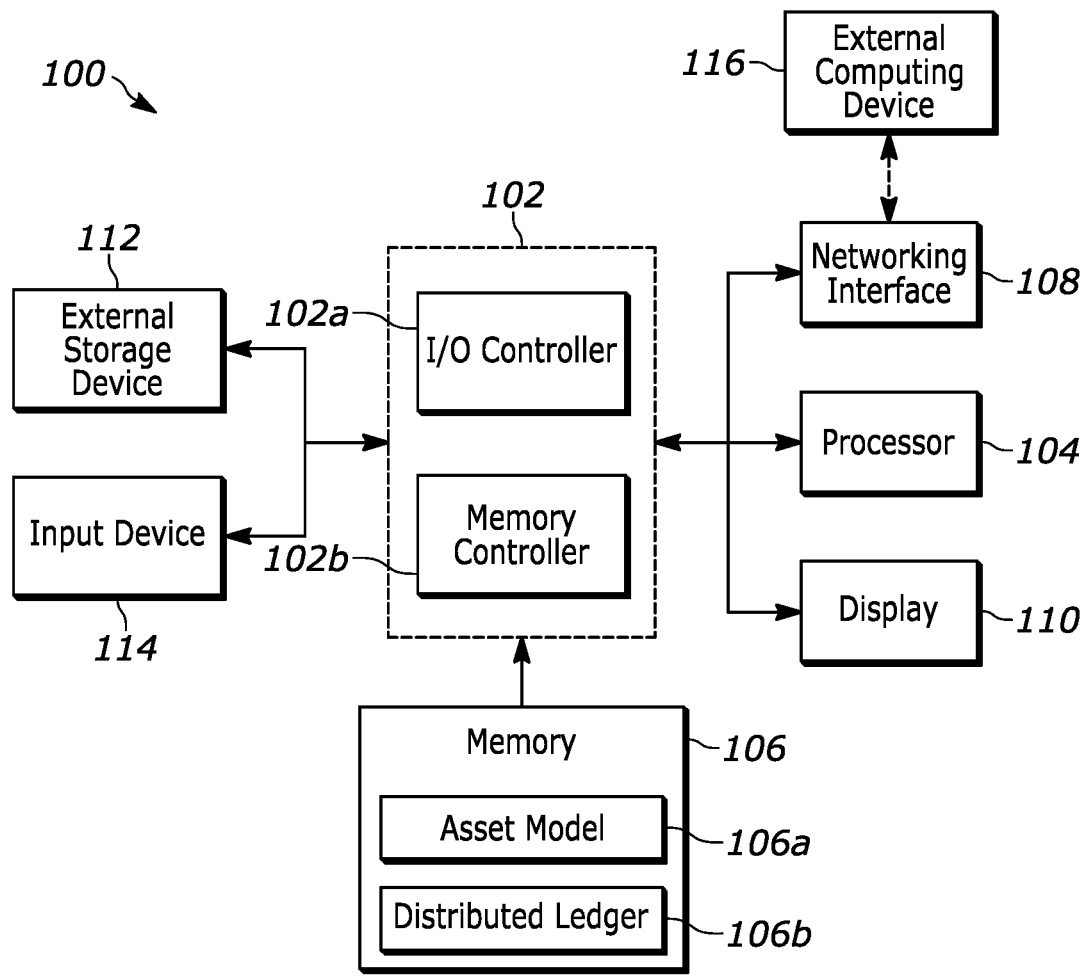

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 1 is a block diagram illustrating an exemplary computing system in accordance with an illustrative embodiment, in accordance with various embodiments herein.

FIG. 2A is an exemplary distributed ledger system for recording transactions and executing smart contracts in an asset recordation system, in accordance with various embodiments herein.

FIG. 2B illustrates exemplary components of a network node on a distributed ledger network in an asset recordation system, in accordance with various embodiments herein.

Figure 3:
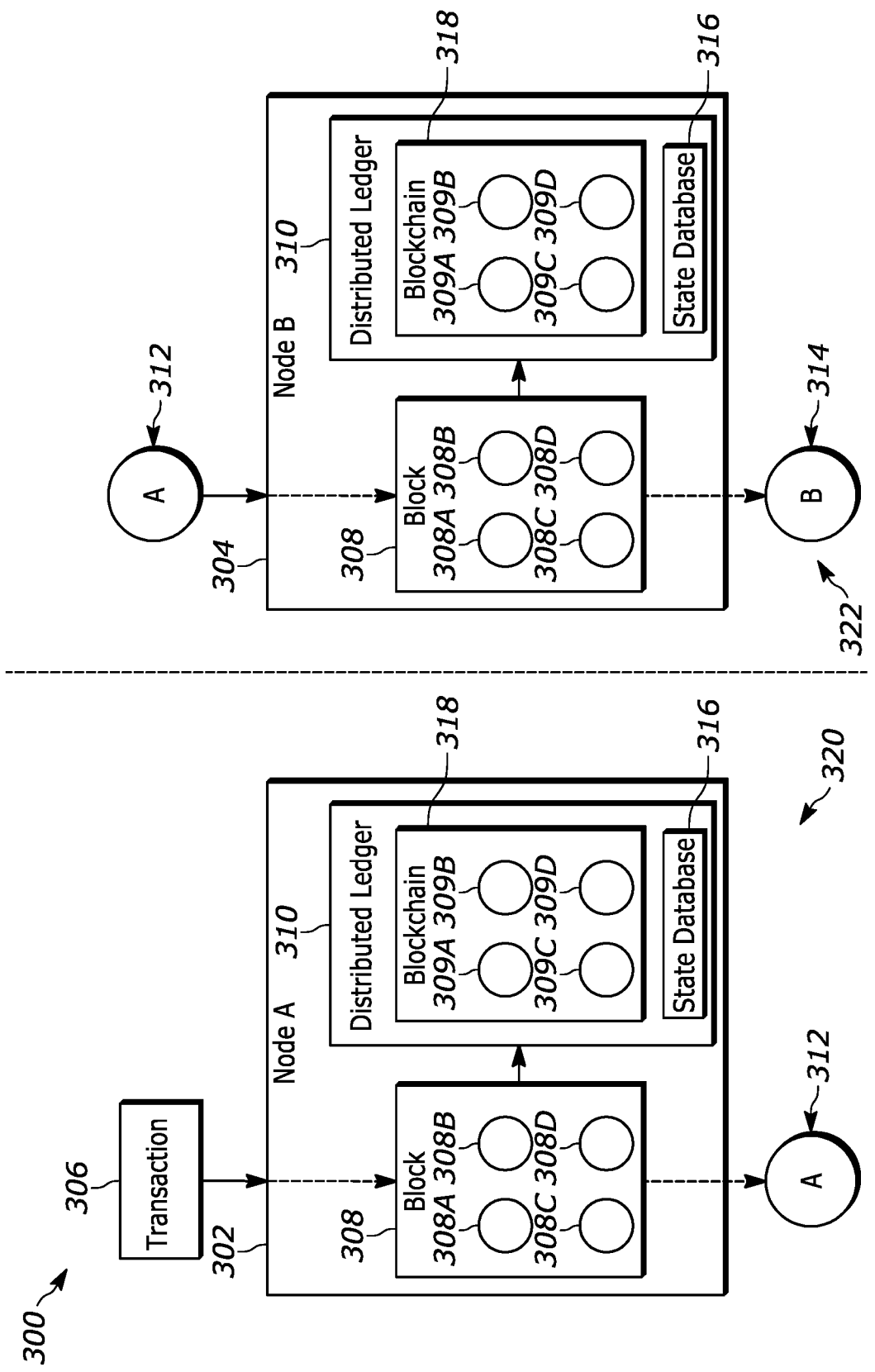

FIG. 3 illustrates exemplary validating network nodes and an exemplary transaction flow on a distributed ledger network in an asset recordation system, in accordance with various embodiments herein.

Figure 4:
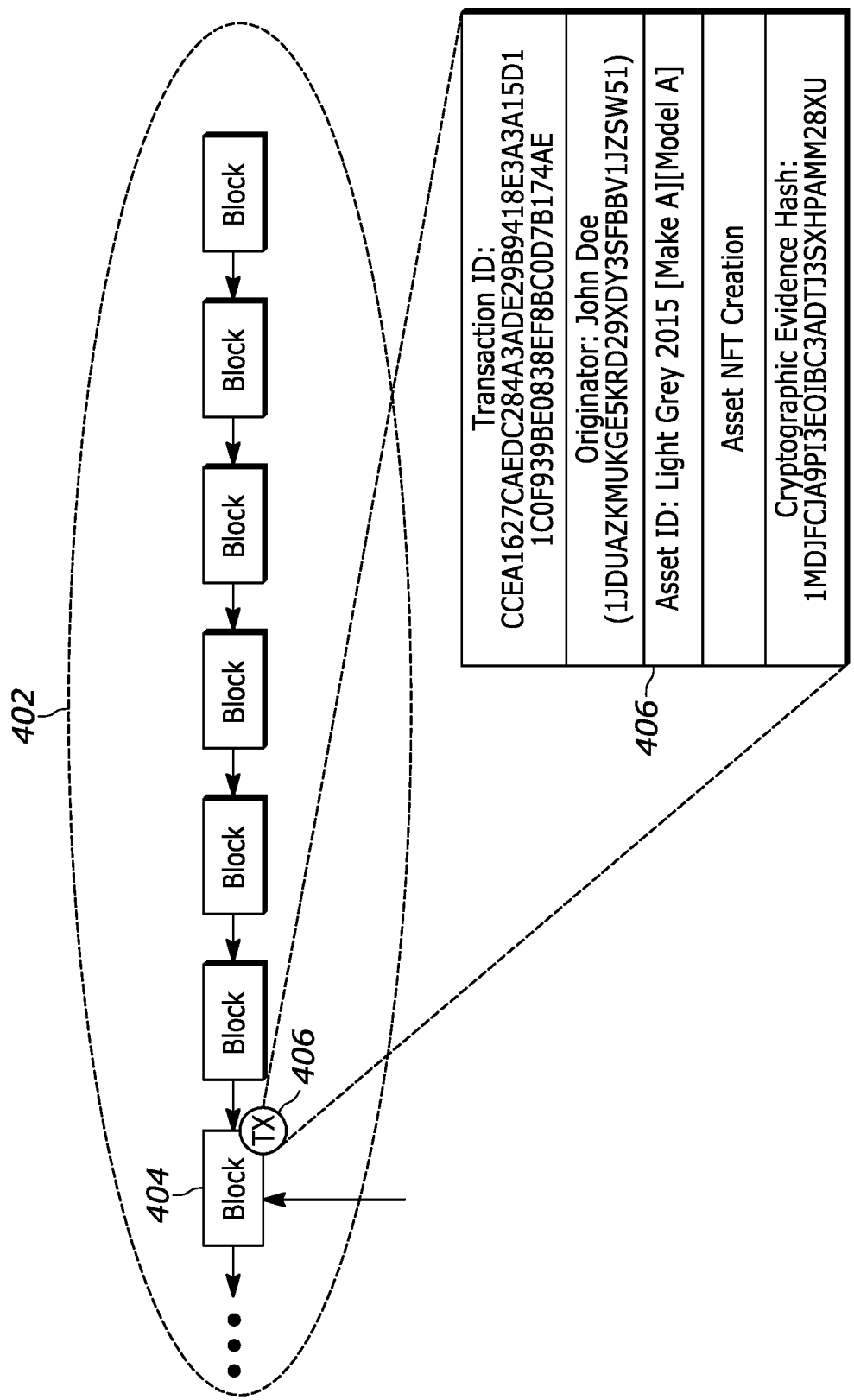

FIG. 4 illustrates an exemplary transaction recording identification information for an asset in a public distributed ledger, in accordance with various embodiments herein.

Figure 5A:
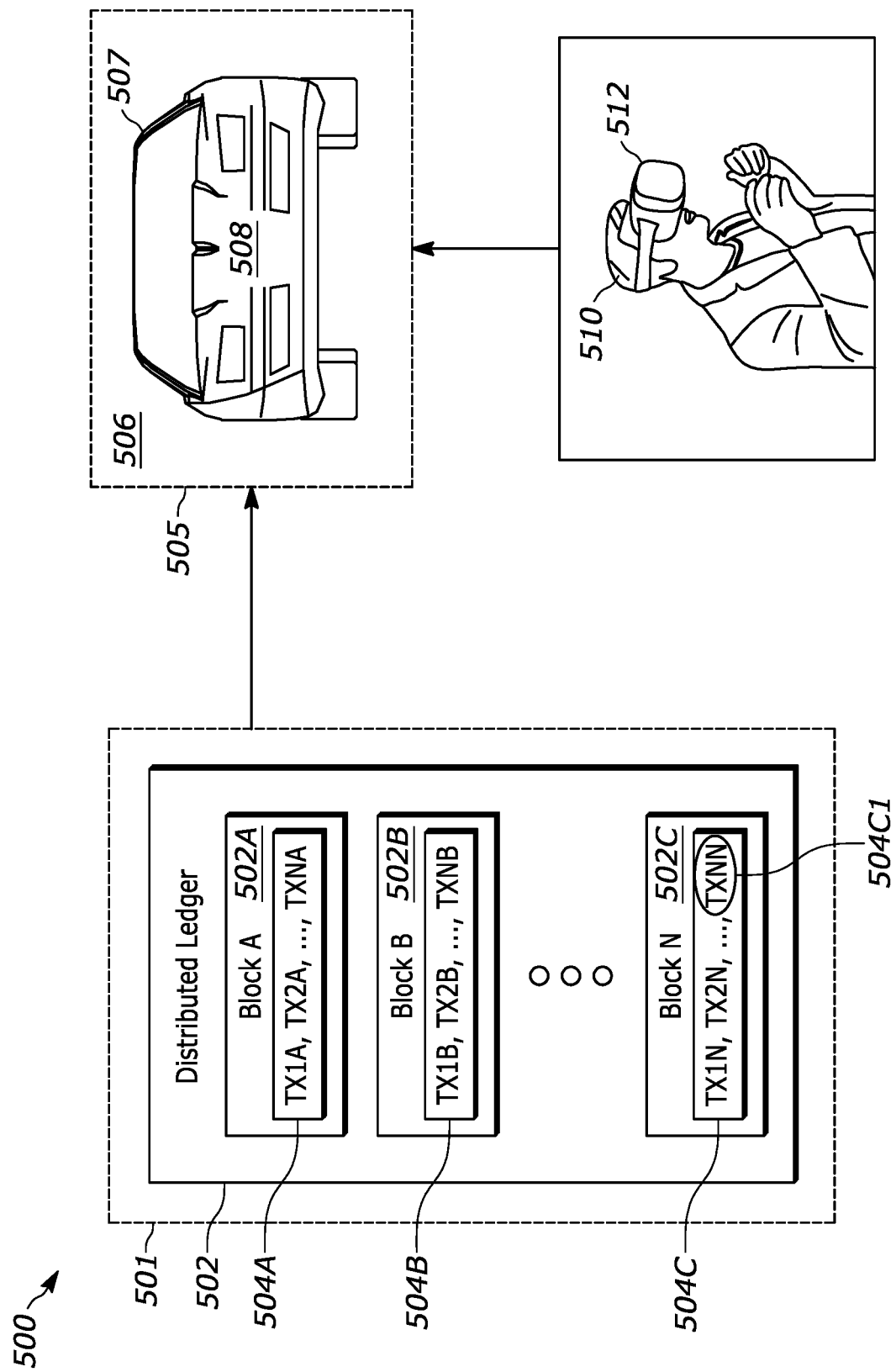

FIG. 5A illustrates an exemplary digital asset minting transaction and upload to a virtual environment for viewing by a user in the virtual environment, in accordance with various embodiments herein.

FIG. 5B illustrates an exemplary display showing the newly minted digital asset from FIG. 5A, and a corresponding status, in accordance with various embodiments herein.

Figure 5C:
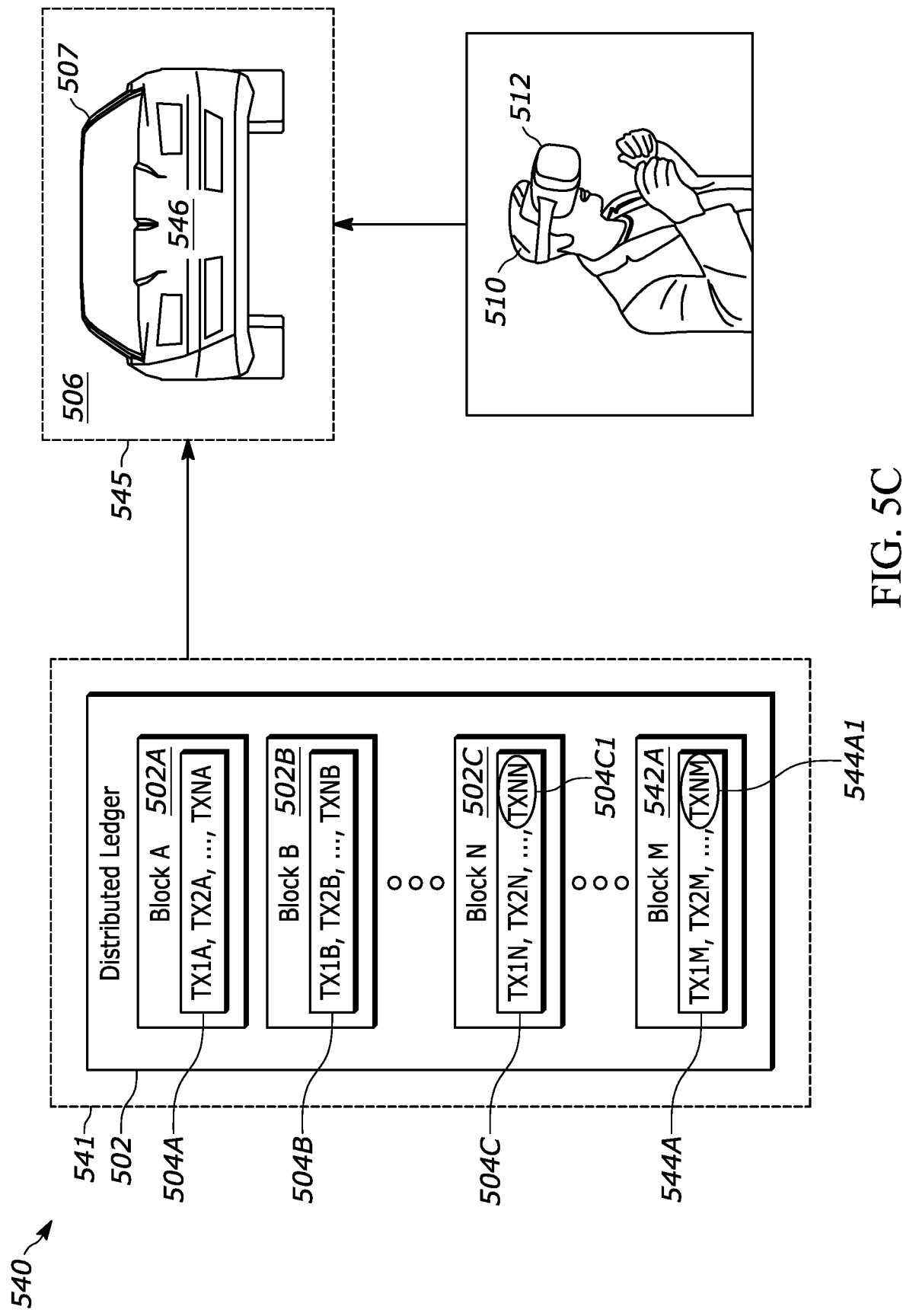

FIG. 5C illustrates an exemplary updated transaction related to the digital asset of FIG. 5A and upload to a virtual environment for viewing by a user in the virtual environment, in accordance with various embodiments herein.

Figure 5D:
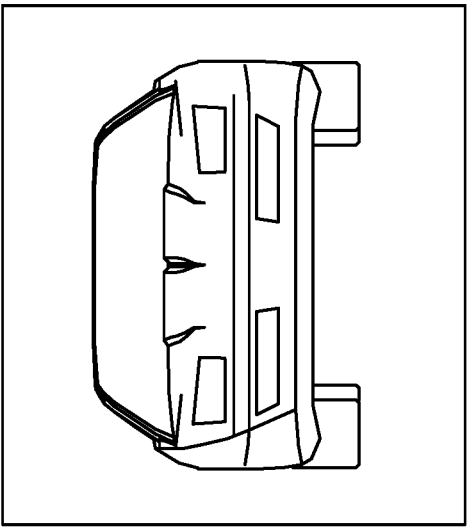

FIG. 5D illustrates an exemplary display showing the updated status of the digital asset from FIG. 5C, in accordance with various embodiments herein.

Figure 6A:
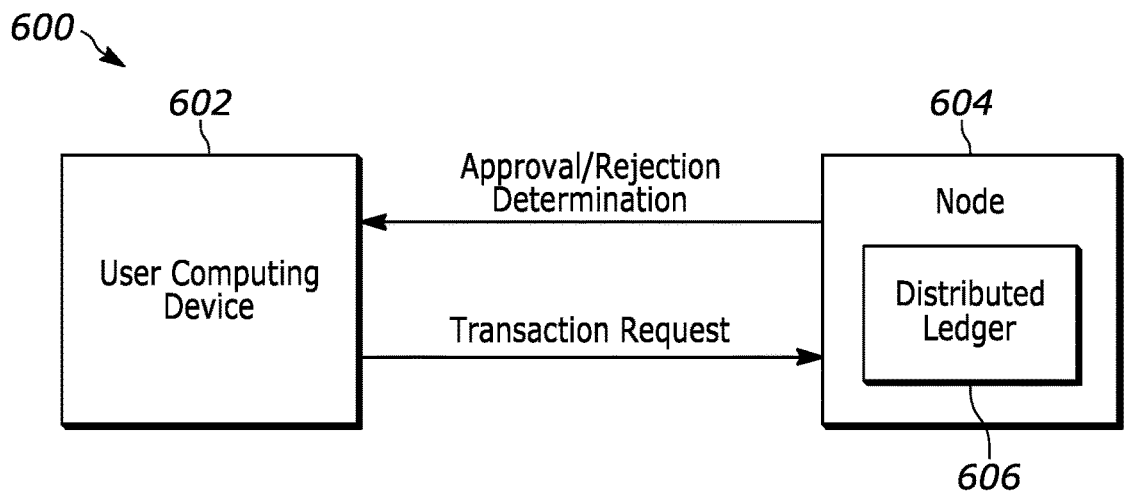
Figure 6B:
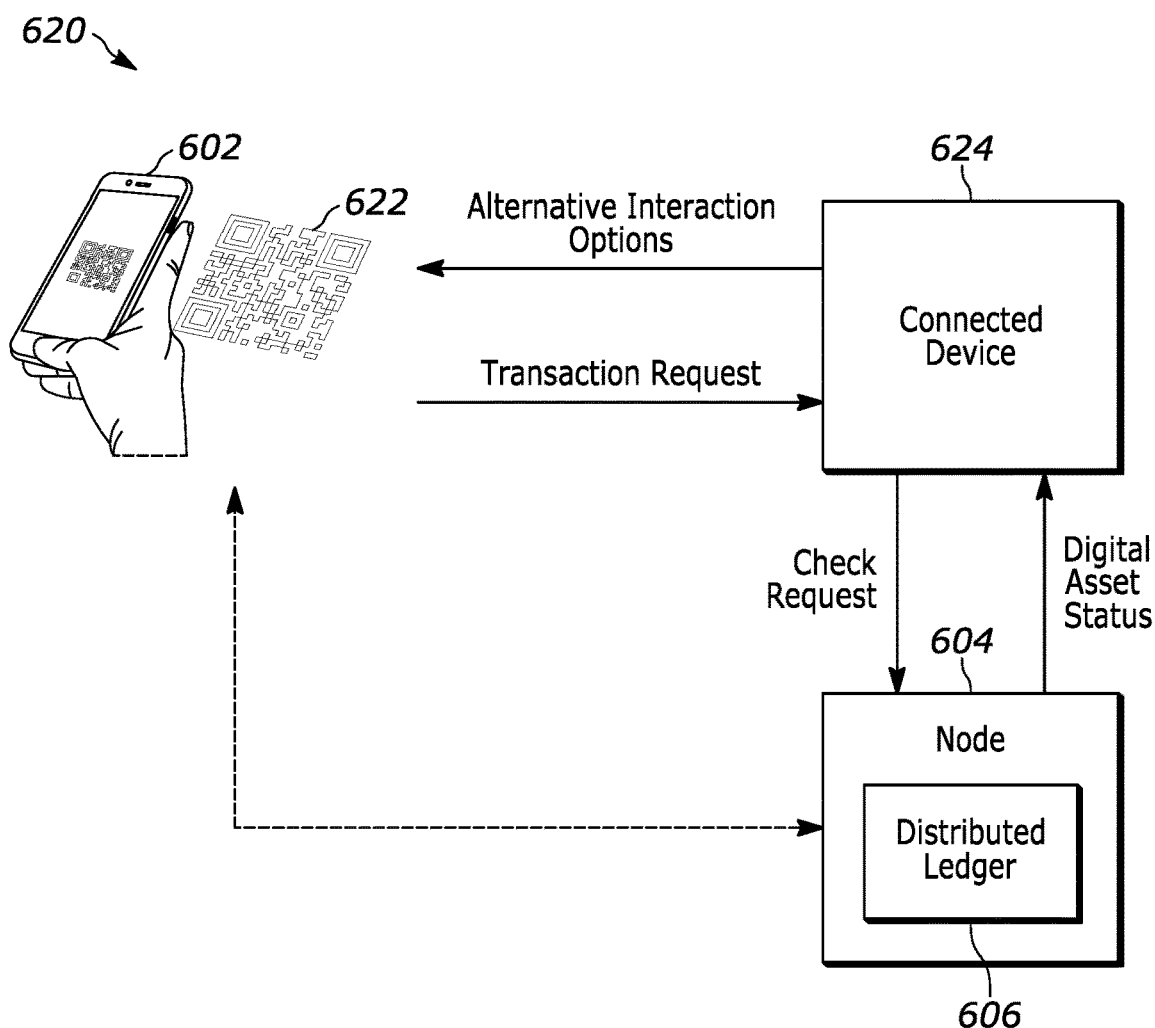

FIGS. 6A and 6B depict transaction requests that are approved or denied based on a current status of a digital asset recorded in a distributed ledger, in accordance with various embodiments herein.

Figure 7:
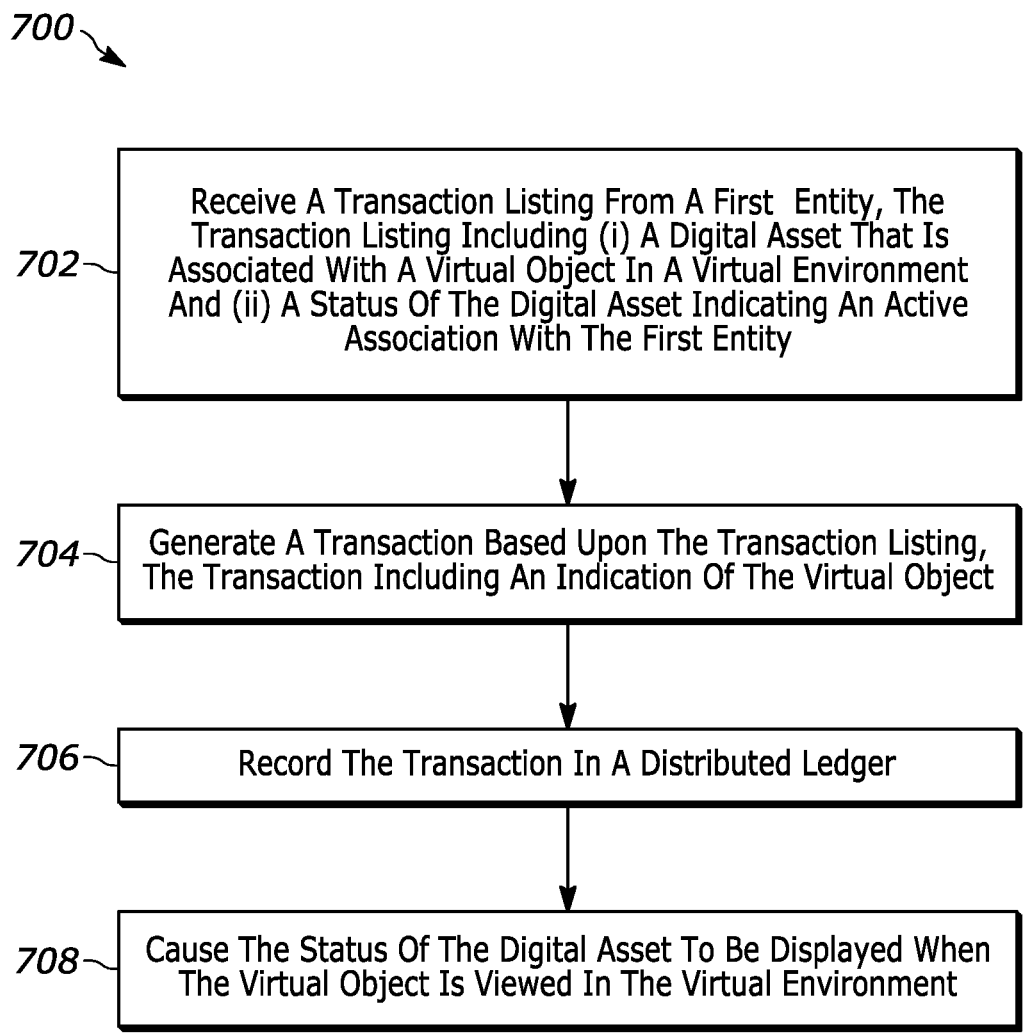

FIG. 7 is a block diagram of an exemplary computer-implemented method for minting tokens to mark virtual objects in a virtual environment, in accordance with various embodiments herein.

DETAILED DESCRIPTION

Generally speaking, a distributed ledger is a storage mechanism for data, events, transactions, etc. that is maintained by several participants. More specifically, a distributed ledger is a way of achieving a distributed consensus on the validity or invalidity of information recorded in the distributed ledger. In other words, the distributed ledger provides a decentralized trust to participants and observers. As opposed to relying on a central authority, a distributed ledger is a decentralized database in which a transactional record of changes to the ledger is maintained and validated by each node of a peer-to-peer network. One type of distributed ledger, a blockchain, is comprised of groupings of transactions organized together into a "block," and ordered sequentially. While the distributed ledgers discussed herein are referred to in the context of a blockchain, this is merely one example of a distributed ledger. Distributed ledgers may also include a tangle, a block lattice, or other directed acyclic graph (DAG). In any event, nodes may join and leave the blockchain network over time and may obtain blocks from peer nodes that were propagated while the node was gone. Nodes may maintain addresses of other nodes and exchange addresses of known nodes with one another to facilitate the propagation of new information across the network in a decentralized, peer-to-peer manner.

The nodes that share the ledger form what is referred to herein as the distributed ledger network. The nodes in the distributed ledger network validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. A consensus rule may require that blocks and transactions adhere to format requirements and supply certain meta information regarding the change (e.g., blocks must be below a size limit, transactions must include a number of fields, etc.). Consensus rules may include a mechanism to determine the order in which new blocks are added to the chain (e.g., through a proof-of-work system, proof-of-stake, etc.).

Additions to the blockchain that satisfy the consensus rules are propagated from nodes that have validated the addition to other nodes recognized by the validating node. If all of the nodes that receive a change to the blockchain validate the new block, then the distributed ledger reflects the new change as stored on all nodes, and it may be said that distributed consensus has been reached with respect to the new block and the information contained therein. Any change that does not satisfy the consensus rule is disregarded by validating nodes that receive the change and the change is not propagated to other nodes. Accordingly, unlike a traditional system which uses a central authority, a single party cannot unilaterally alter the distributed ledger unless the single party can do so in a way that satisfies the consensus rules. The inability to modify past transactions leads to blockchains being generally described as trusted, secure, and immutable.

The validation activities of nodes applying consensus rules on a blockchain network may take various forms. In one embodiment, the blockchain may be viewed as a shared spreadsheet that tracks data such as the ownership of assets. In another embodiment, the validating nodes execute code contained in "smart contracts" and distributed consensus is expressed as the network nodes agreeing on the output of the executed code.

As previously mentioned, a smart contract is a computer protocol that enables the automatic execution and/or enforcement of an agreement between different parties. In particular, the smart contract may be computer code that is located at a particular address on the blockchain. In some cases, the smart contract may run automatically in response to a participant in the blockchain sending funds (e.g., a cryptocurrency such as bitcoin, ether, or other digital/virtual currency) to the address where the smart contract is stored. Additionally, smart contracts may maintain a balance of the amount of funds that are stored at their address. In some scenarios when this balance reaches zero the smart contract may no longer be operational.

The smart contract may include one or more trigger conditions, that, when satisfied, correspond to one or more actions. For some smart contracts, the action(s) performed may be determined based upon one or more decision conditions. In some instances, data streams may be routed to the smart contract so that the smart contract may detect that a trigger condition has occurred and/or analyze a decision condition.

Blockchains may be deployed in a public, decentralized, and permissionless manner meaning that any party may view the distributed ledger, submit new information to be added to the ledger, or join the network as a validating node. Other blockchains are private (e.g., permissioned ledgers) that keep chain data private among a group of entities authorized to participate in the blockchain network. Other blockchain implementations may be both permissioned and permissionless whereby participants may need to be validated, but only the information that participants in the network wish to be public is made public.

In some embodiments, a distributed ledger includes multiple blockchains such as a main blockchain and several side chains operating independently of the main blockchain. The side chains then interact with the main blockchain to provide some of the transaction data from the side chains to the main blockchain. In this manner, the side chains can be permissioned or private while the main blockchain is public or available to a larger number of entities than the side chains. Non-sensitive information from the side chains may be shared on the main blockchain. Also in some embodiments, a distributed ledger includes multiple layers or separate blockchains executing in parallel that are maintained by the same validating nodes. Some of the transaction data from the blockchain for the first layer may be provided to the blockchain for the second layer or vice versa.

In one example, a distributed ledger in an asset recordation system may be maintained by validating nodes which transmit data to remote systems using one or more public and/or private networks, such as a private enterprise network, the Internet, a cellular router, a backhaul Internet or other type backhaul connection. The validating nodes receive transactions broadcasted to the distributed ledger network by for example, user devices. The nodes then validate the broadcasted transactions. In another example, the validating nodes execute code contained in smart contracts and other devices act as "evidence oracles" which provide evidence related to title transfers, maintenance updates, etc. to the blockchain. Oracles may be systems, devices, or entities that connect a deterministic system with a non-deterministic system or data source.

Regardless, the systems and methods of the present disclosure may rely on and/or otherwise include this distributed ledger technology to enable vehicle owners/sellers to track transactions related to a real-world vehicle and/or other real-world object( )(e.g., homes or houses, real property, personal articles or personal belongings, etc.), such as by minting digital assets in a virtual environment that represent a product or service (e.g., maintenance, dealerships, insurance, etc.) associated with a real-world vehicle or other real-world object(s). As a result, a user may maintain all vehicle-based transactions related to their vehicle on the blockchain as a trusted, secure, and/or immutable form of record-keeping/documentation. For example, such a user may record mechanic repairs/maintenance, buying/selling vehicles, vehicle recalls, carbon tax credits received by the user as a result of owning/driving the vehicle, and/or any other transactions involving the user's vehicle.

As another example, a service provider (eg., insurance provider) may post transactions to the distributed ledger that include a digital asset representing recently purchased vehicle insurance for the real-world vehicle, Posting the transaction with the digital asset to the distributed ledger for a first time may represent the service provider minting the digital asset on the distributed ledger. This minted digital asset may then be disposed proximate to a virtual object representing the vehicle in the virtual environment, and the status of the digital asset may change over time as the association between the vehicle owner/real-world vehicle and the insurance provider changes (e.g., active/inactive insurance policy).

In the following description, for the purposes of explanation, specific details are set forth in order to provide a thorough understanding of various embodiments and examples. Various embodiments may be practiced without these specific details. The figures and description are not intended to be restrictive.

Exemplary Computing Systems and Components for Executing A Distributed Ledger Network FIG. 1 is a block diagram illustrating an exemplary computing system 100 in accordance with an illustrative embodiment, in accordance with various embodiments herein. In other examples, fewer, additional, or different components may be present. The computing system 100 may be any suitable computing machine such as a tablet, smart phone, mobile device, laptop computer, desktop computer, server, remote client device, gaming device, smart television device, wearable computer, or any combination thereof. The computing system 100 may include at least one processor 104 coupled to a central hub 102. The central hub 102 may include a memory controller 102b and an input/output (I/O) controller 102a. Each of a memory 106, a networking interface 108, a display 110, an external storage device 112, and an input device 114 may be coupled to the central hub 102. In certain instances, the memory 106 may be coupled specifically to the memory controller 102b; and the external storage device 112, the input device 114, networking interface 108, and the display 110 may be coupled to the I/O controller 102a. Other examples of the computing system 100 may be characterized by different architectures.

Broadly speaking, the computing system 100 may represent a node of a distributed ledger system. This distributed ledger system may include a public ledger, a private ledger, a federated ledger, and/or any other suitable ledgers or layers and combinations thereof. For example, the computing system 100 may include an Internet of Things (IoT)/device layer (not shown) stored in memory 106. The IoT layer may be a system of interrelated computing devices, mechanical and digital machines, objects, animals or people that are provided with unique identifiers (UIDs) and have the ability to transfer data over a network (via networking interface 108) without requiring human-to-human or human-to-computer interaction.

Users (e.g., buyers, sellers, maintenance professionals, appraisers, etc.) may interact through the computing system 100 by recording asset transactions of real world assets (e.g., vehicles, homes or houses, real property, personal articles or personal belongings, etc.) via the distributed ledger 106b. Additionally, other applications, application programming interfaces (APIs), algorithms/models (e.g., the asset model 106a), and/or intelligent user interfaces may also be stored in the memory 106 and utilized with the distributed ledger 106b to facilitate the recordation and/or transfer of assets.

The assets may be real world assets, virtual assets, intellectual assets (e.g., patents, trademarks, copyrights, etc.), and/or any suitable type of assets or combinations thereof. The asset information included in records of the distributed ledger 106b and/or otherwise utilized by the processor 104 when updating the distributed ledger 106b may include identification information for the asset, such as a name of the asset, a location of the asset, a unique identification number for the asset, any digital assets (e.g., NFTs) associated with the asset, etc. The asset information may also include ownership information for the asset, such as a name of the person or organization that currently owns the asset, an address of the current owner, a phone number of the current owner, and/or any other suitable identification information for the current owner. The ownership information may also include identification information for each of the previous owners of the asset, dates on which the asset was transferred, etc. Still further, the asset information may include title information for the asset, encumbrances on the asset, documents related to the title and transfers of ownership, etc., such as deeds, contracts related to the sale of the asset, mortgages and/or liens on the asset, leases on the asset, etc.

Accordingly, the distributed ledger 106b may generally include information corresponding to assets (e.g., vehicles, homes or houses, real property, personal belongings such as antiques or jewelry, etc.). As an example where the assets are vehicles, the distributed ledger 106b may include identification information for each vehicle, such as vehicle origination and identification information, a certificate of origin of the vehicle, a vehicle identification number, a make, a model, a year, a body type, a shipping weight, a series, a number of cylinders, or a name of a distributer or dealer, insurance information, and/or an NFT/certificate representative of any of this information or combinations thereof. The distributed ledger 106b may further include ownership information for the vehicle, such as the name, address, phone number, unique identification number, etc., of a person or organization that owns the vehicle, and/or identification information for each previous owner of the vehicle. Moreover, the distributed ledger 106b may include transaction-related documents, such as the title to the vehicle, contracts signed by each party, maintenance records, insurance documents, etc. In certain embodiments, the processors 104 may obtain the identification information, the ownership information, and/or transaction-related documents for recordation in the distributed ledger 106b from a credit agency, a department of motor vehicles registry, a manufacturer database, a legacy recording system, and/or other data or lien sources (e.g., via the networking interface 108).

In any event, the computing system 100 may also communicate with external computing devices 116 (also referenced herein as "nodes") to perform the validation/consensus process required to update/change entries included in the distributed ledger 106b. In certain embodiments, these external computing devices 116 may also be or include integration devices and/or legacy systems that store and/or otherwise include identification information, ownership information, transaction-related documents and/or any other suitable information for assets that is relevant to the entries in the distributed ledger 106b. For example, the integration devices of the external computing devices 116 may be or include middleware used to transform, route, clone, and/or translate data between multiple computing systems 100.

When the computing system 100 receives and/or otherwise has the necessary asset information, and the processor 104 successfully executes the validation/consensus calculations/process, then the processor 104 may record any suitable asset information into the distributed ledger 106b. As part of this recordation in the distributed ledger 106b, the processor 104 may mint a token (e.g., an NFT) representing the asset, where the token acts as a digital deed or certificate of ownership of the asset. Additionally, or alternatively, the processor 104 may mint a digital asset representing a product or service (e.g., maintenance, dealerships, insurance, etc.) associated with the asset.

In addition to minting an NFT representing the asset and/or a product/service associated with the asset, the processor 104 may communicate with a third-party certificate authority (e.g., included as part of an external computing device 116) to generate a certificate of authenticity for the owner of the asset, and/or the processor 104 may mint and/or otherwise receive a verifiable credential from an issuer (e.g., prior owner) corresponding to the asset. The received verifiable credential and/or certificate may be stored in a user's digital wallet, such that the verifiable credential and/or certificate may be accessible only by the user and other users/entities to which the user shares the verifiable credential and/or certificate.

Such a verifiable credential may be or include a hash value representative of a transaction that occurred corresponding to the asset. Therefore, if the asset is a digital/virtual asset, the verifiable credential may represent authenticated transactions corresponding to the asset without storing the asset directly in the distributed ledger 106b. The certificate and/or verifiable credential may include a description of the asset, such as a name of the asset, a location of the asset, a unique identification number for the asset, etc.; and identification information for the owner of the asset, such as a name of the person or organization that currently owns the asset, an address of the current owner, a phone number of the current owner, etc. The certificate and/or verifiable credential may also include information corresponding to the asset that is recorded in and/or otherwise associated with the distributed ledger 106b, such as a reference to the NFT, certificate, and/or verifiable credential representing the asset (e.g., a token ID and/or smart contract address for the NFT) and/or product/service associated with the asset.

In some embodiments, the memory 106 may additionally include instructions that enable the processor 104 to recognize and classify digital certificates of authenticity and/or verifiable credentials as either from a valid, "accredited" authenticator (e.g., Verisart for physical art, PSA for sports trading cards, etc.) and to reject a digital certificate of authenticity and/or verifiable credential if it is not from a valid "accredited" authenticator. For example, the instructions stored in memory 106 may cause the processor 104 to identify acceptable, valid patterns in certificates of authenticity and/or verifiable credentials from the accredited providers.

Regardless, the operations described herein and with respect to FIGS. 2-7 may be performed partially or wholly on, or otherwise using, the processor 104. For example, the processor 104 can execute one or more operations for generating and/or applying an asset model 106a for generating estimated asset values, digital asset transaction values, and/or other values corresponding to an asset and asset transfer. In some examples, the asset model 106a may be or may include one or more AI models. The processor 104 can execute instructions stored in the memory 106 to perform the operations. The processor 104 can include one processing device or multiple processing devices or cores. For example, the processor 104 may be or include one or more central processing units (CPUs), one or more graphics processing units (GPUs), one or more Field-Programmable Gate Arrays (FPGAs), one or more application-specific integrated circuits (ASICs), one or more microprocessors, etc.

Further, the processor(s) 104 may be connected to the memory 106 via a computer bus responsible for transmitting electronic data, data packets, or otherwise electronic signals to and from the processor(s) 104 and memory 106 in order to implement or perform the machine readable instructions, methods, processes, elements or limitations, as illustrated, depicted, or described for the various flowcharts, illustrations, diagrams, figures, and/or other disclosure herein.

The processor(s) 104 may interface with the memory 106 via the computer bus to execute an operating system (OS). The processor(s) 104 may also interface with the memory 106 via the computer bus to create, read, update, delete, or otherwise access or interact with the data stored in the memory 106 and/or the external storage device 112 (e.g., a relational database, such as Oracle, DB2, MySQL, or a NoSQL based database, such as MongoDB). The data stored in the memories 106 and/or the external storage device 112 may include all or part of any of the data or information described herein, including, for example, training data and/or asset data (e.g., vehicle data) or other information of the user or a corresponding asset. The memory 106 may include one or more persistent memories (e.g., a hard drive and/or solid state memory) and may store one or more applications, modules, and/or models such as the asset model 106a.

In general, a computer program or computer based product, application, or code (e.g., the model(s), such as AI models, or other computing instructions described herein) may be stored on a computer usable storage medium, or tangible, non-transitory computer-readable medium (e.g., standard random access memory (RAM), an optical disc, a universal serial bus (USB) drive, or the like) having such computer-readable program code or computer instructions embodied therein, wherein the computer-readable program code or computer instructions may be installed on or otherwise adapted to be executed by the processor 104 (e.g., working in connection with the respective operating system in the memory 106) to facilitate, implement, or perform the machine readable instructions, methods, processes, elements or limitations, as illustrated, depicted, or described for the various flowcharts, illustrations, diagrams, figures, and/or other disclosure herein. In this regard, the program code may be implemented in any desired program language, and may be implemented as machine code, assembly code, byte code, interpretable source code or the like (e.g., via Golang, Python, C, C++, C #, Objective-C, Java, Scala, ActionScript, JavaScript, HTML, CSS, XML, etc.).

More generally, the memory 106 may include one or more forms of volatile and/or non-volatile, fixed and/or removable memory, such as read-only memory (ROM), electronic programmable read-only memory (EPROM), random access memory (RAM), erasable electronic programmable read-only memory (EEPROM), and/or other hard drives, flash memory, MicroSD cards, and others. The memory 106 may store an operating system (OS) (e.g., Microsoft Windows, Linux, Unix, etc.) capable of facilitating the functionalities, apps, methods, or other software as discussed herein. The memory 106 may also store an asset model 106a, which may be artificial intelligence based models, such as a machine learning model trained on various asset data, digital asset data, and/or transaction data, as described herein. Additionally, or alternatively, the asset model 106a may also be stored in the external storage device 112, which is accessible or otherwise communicatively coupled to the central hub 102.

The memory 106 may also store machine readable instructions, including any of one or more application(s), one or more software component(s), and/or one or more application programming interfaces (APIs), which may be implemented to facilitate or perform the features, functions, or other disclosure described herein, such as any methods, processes, elements or limitations, as illustrated, depicted, or described for the various flowcharts, illustrations, diagrams, figures, and/or other disclosure herein. For example, at least some of the applications, software components, or APIs may be, include, otherwise be part of, an asset or transactional machine learning model or component, such as the asset model 106a, where each may be configured to facilitate their various functionalities discussed herein. It should be appreciated that one or more other applications may be envisioned and that are executed by the processor 104.

In some examples, the memory 106 can include computer program instructions for executing or applying the asset model 106a. For example, the instructions can include the asset model 106a that is executable by the processor 104 for causing the processor 104 to output one or more evaluations or assessments of a potential list price of an asset, potential listing titles/descriptions for the asset, potential digital asset transaction classifications/values (e.g., status updates, appearance updates, etc.), and/or other suitable values or combinations thereof. The evaluations/estimations or assessments of the potential list price of the asset may include quantitative values, such as numeric scores or other types of quantitative information indicating whether the potential list price is within a threshold range of a predicted sale price for the asset. For example, the asset model 106a may output quantitative information, such as a percentage score or a percentile score indicating a likelihood that the asset will sell for the potential list price. In another example, the asset model 106a may output qualitative information, such as a predicted/estimated digital asset transaction classification/value that may correspond to a status update for the digital asset.

More specifically, in certain embodiments, the processor 104 may utilize one or more machine learning (ML) techniques to train the asset model 106a as a ML model. The asset model 106a may be trained using a training dataset that includes a plurality of asset data, such as prior listing values for an asset, prior sale values for an asset, prior listing titles/descriptions for an asset, prior transaction classification/values for digital assets, and/or any other suitable data and combinations thereof. The asset model 106a may use the training dataset to output, for each asset for which the model 106a receives asset data as an input, a potential listing value, a potential sale value, a recommended listing title/description, a status and/or appearance update for a digital asset, and/or other suitable values or combinations thereof.

Generally speaking, ML techniques have been developed that allow parametric or nonparametric statistical analysis of large quantities of data. Such ML techniques may be used to automatically identify relevant variables (i.e., variables having statistical significance or a sufficient degree of explanatory power) from data sets. This may include identifying relevant variables or estimating the effect of such variables that indicate actual observations in the data set. This may also include identifying latent variables not directly observed in the data, viz. variables inferred from the observed data points. More specifically, a processor or a processing element may be trained using supervised or unsupervised ML.

In supervised machine learning, a machine learning program operating on a server, computing device, or otherwise processors, may be provided with example inputs (e.g., "features") and their associated, or observed, outputs (e.g., "labels") in order for the machine learning program or algorithm to determine or discover rules, relationships, patterns, or otherwise machine learning "models" that map such inputs (e.g., "features") to the outputs (e.g., labels), for example, by determining and/or assigning weights or other metrics to the model across its various feature categories. Such rules, relationships, or otherwise models may then be provided subsequent inputs in order for the model, executing on a server, computing device, or otherwise processors as described herein, to predict or classify, based upon the discovered rules, relationships, or model, an expected output, score, or value.

In unsupervised machine learning, the server, computing device, or otherwise processors, may be required to find its own structure in unlabeled example inputs, where, for example multiple training iterations are executed by the server, computing device, or otherwise processors to train multiple generations of models until a satisfactory model, e.g., a model that provides sufficient prediction accuracy when given test level or production level data or inputs, is generated.

Exemplary ML programs/algorithms that may be utilized by the processor 104 to train the asset model 106a may include, without limitation: neural networks (NN) (e.g., convolutional neural networks (CNN), deep learning neural networks (DNN), combined learning module or program), linear regression, logistic regression, decision trees, support vector machines (SVM), naïve Bayes algorithms, k-nearest neighbor (KNN) algorithms, random forest algorithms, gradient boosting algorithms, Bayesian program learning (BPL), voice recognition and synthesis algorithms, image or object recognition, optical character recognition (OCR), natural language understanding (NLU), and/or other ML programs/algorithms either individually or in combination.

After training, ML programs (or information generated by such ML programs) may be used to evaluate additional data. Such data may be and/or may be related to asset data of particular assets that was not included in the training dataset. The trained ML programs (or programs utilizing models, parameters, or other data produced through the training process) may accordingly be used for determining, assessing, analyzing, predicting, estimating, evaluating, or otherwise processing new data not included in the training dataset. Such trained ML programs may, therefore, be used to perform part or all of the analytical functions of the methods described elsewhere herein.

It is to be understood that supervised ML and/or unsupervised ML may also comprise retraining, relearning, or otherwise updating models with new, or different, information, which may include information received, ingested, generated, or otherwise used over time. The disclosures herein may use one or more of such supervised and/or unsupervised ML techniques. Further, it should be appreciated that, as previously mentioned, the asset model 106a may be used to output potential listing values, potential sale values, recommended listing titles/descriptions, potential digital asset transaction classifications/values, and/or other suitable values or combinations thereof, using artificial intelligence (e.g., a ML model of the asset model 106a) or, in alternative aspects, without using artificial intelligence.

Moreover, although the methods described elsewhere herein may not directly mention ML techniques, such methods may be read to include such ML for any determination or processing of data that may be accomplished using such techniques. In some aspects, such ML techniques may be implemented automatically upon occurrence of certain events or upon certain conditions being met. In any event, use of ML techniques, as described herein, may begin with training a ML program, or such techniques may begin with a previously trained ML program.

In any event, the memory 106 may also include a copy of a distributed ledger 106b. Namely, the memory 106 may store a copy of a distributed ledger 106b that is distributed and/or otherwise stored on various other computing systems (e.g., other nodes). The copy of the distributed ledger 106b stored in the memory 106 may include transaction records corresponding to multiple different users and multiple different assets. For example, the distributed ledger 106b may include transaction records corresponding to a first user selling a first asset (e.g., a piece of artwork), buying a second asset (e.g., a first vehicle), and paying for maintenance of the second asset. Similarly, the distributed ledger 106b may include transaction records corresponding to a second user buying a third asset (e.g., a second vehicle) and acquiring maintenance as a result of a recall of the third asset. The distributed ledger 106b may further include transaction records corresponding to newly minted digital assets (e.g., NFTs) and/or updated digital assets representing a product or service (e.g., maintenance, dealerships, insurance, etc.) associated with an asset (e.g., a real-world vehicle).

Therefore, as the memory 106 stores a copy of the distributed ledger 106b, the computing system 100 may contribute and/or otherwise participate in updating and/or validating additional entries or changes to the distributed ledger 106b by achieving consensus with the other nodes (not shown) that include a copy of the distributed ledger 106b. Further, the distributed ledger 106b may also include the consensus rules and/or other instructions required for the computing system 100 to perform the calculations necessary to validate new additions and/or changes to entries in the ledger 106b. The computing system 100 may communicate with the other connected nodes that participate in the validation/consensus process for the distributed ledger 106b through the networking interface 108.

In particular, the computing system 100 includes a networking interface 108 to connect with external devices, such as the additional nodes that contribute and/or otherwise participate in the updating/changing of entries in the distributed ledger 106b through the consensus process. More specifically, the networking interface 108 may enable the computing system 100 to communicate with other computing systems (e.g., additional nodes) across a network through their respective networking interfaces 108. The networking interface 108 may support wired or wireless communications, such as USB, Bluetooth, Wi-Fi Direct, Near Field Communication (NFC), etc. The networking interface 108 may allow the computing system 100 to communicate with other computing systems via a wireless communication network such as a fifth-, fourth-, or third-generation cellular network (5G, 4G, or 3G, respectively), a Wi-Fi network (802.11 standards), a WiMAX network, a wide area network (WAN), a local area network (LAN), etc.

The computing system 100 may also provide a display 110, an input device 114, and/or other I/O components (e.g., ports, capacitive or resistive touch sensitive input panels, keys, buttons, lights, LEDs), which may be directly accessible via or attached to the computing system 100 or may be indirectly accessible. According to some embodiments, a user may access the computing system 100 via the input device 114 to review information, make changes, input training data or images, and/or perform other functions.

For example, and to provide for interaction with an individual, the herein disclosed embodiments may be implemented using the display 110, such as a user interface. Such user interfaces may include interactive features such as pop-up or pull-down menus, lists, selection tabs, checkboxes, radio buttons, toggles, sliders, buttons, hyperlinks and/or other features or user interface widgets that can receive human inputs. The display 110 may also include one or more of a number of output mechanisms, such as a display screen, a printer, a speaker, a heads-up display, an augmented reality display, a virtual reality headset, or any other output or display mechanism.

Further, to enable human (and in some instances, machine) user interaction, the computing system 100 may include an input device 114. The input device 114 may be or include, for example, a microphone for speech and audio, a touch sensitive screen for gesture or graphical input, keyboard, mouse, motion input, motion detection, camera for video and photo input, virtual reality gloves, controllers, thumb rings, wands, move controllers, touch controllers, knuckle controllers, glasses with eye controllers, and the like. In some instances, multimodal input devices 114 may enable a user to provide multiple types of input to communicate with the computing system 100.

In certain embodiments, the computing system 100 may also include clients and servers, in a host server configuration. A client and server may generally be remote from each other, and may typically interact through a communications network. The relationship of client and server arises by virtue of computer programs running on the respective computers and having a client-server relationship to each other. In some examples, a server transmits data (e.g., an HTML page, data tagged by XML, JSON objects, etc.) to a client device (e.g., for purposes of displaying data to and receiving input from a user interacting with the client device). Data generated at the client device (e.g., as a result of user interaction) can be received from the client device at the server.

More specifically, the computing system 100 may act as a hosting server, and may include a networking interface 108 configured to communicate (e.g., send and receive) data via one or more external/network port(s) to one or more networks or local terminals, as described herein. In some embodiments, the computing system 100 may include a client-server platform technology such as ASP.NET, Java J2EE, Ruby on Rails, Node.js, a web service or online API, responsive for receiving and responding to electronic requests. The computing system 100 may implement the client-server platform technology that may interact, via a computer bus, with the memory 106 (including the applications(s), component(s), API(s), data, etc. stored therein) and/or external storage device 112 to implement or perform the machine readable instructions, methods, processes, elements or limitations, as illustrated, depicted, or described for the various flowcharts, illustrations, diagrams, figures, and/or other disclosure herein. According to some embodiments, the computing system 100 may include, or interact with, one or more transceivers (e.g., WWAN, WLAN, and/or WPAN transceivers) functioning in accordance with IEEE standards, 3GPP standards, or other standards, and that may be used in receipt and transmission of data via external/network ports connected to a computer network. In some embodiments, the computer network may comprise a private network or local area network (LAN). Additionally, or alternatively, the computer network may comprise a public network such as the Internet.

FIG. 2A depicts an exemplary distributed ledger system 200 for recording asset information. The distributed ledger system 200 includes a distributed ledger 210 and a plurality of nodes 202, 204, 206, and 208. Each node 202-208 may maintain a copy of the distributed ledger 210. As illustrated, N may be any integer value, such that there may be any suitable number of nodes 202-208 that maintain a copy of the distributed ledger 210. The N number of nodes 202-208 may also each be included as part of the consensus mechanism/method used to update/change the distributed ledger 210.

As previously mentioned, as changes are made to the distributed ledger 210, each node 202-208 receives the change via the network 201 and updates its respective copy of the distributed ledger 210. A consensus mechanism may be used by the nodes 202-208 in the distributed ledger system 200 to decide whether it is appropriate to make received changes to the distributed ledger 210. For example, the consensus mechanism may be the Stellar Consensus Protocol (SCP), a variant of Practical Byzantine Fault Tolerance (PBFT), where nodes 202-208 belonging to intersecting groups run a local consensus protocol among their members, providing a method that is decentralized and open to the public. As a result of this consensus method, every intersecting group may participate in the consensus protocol with very low transaction latency. Of course, it should be understood that any suitable consensus mechanism/method or combinations thereof may be used.

Therefore, by maintaining a consensus among the nodes 202-208 to authorize any/all updates/changes to the distributed ledger 210, each node 202-208 in the distributed ledger system 200 may have an identical copy of the distributed ledger 210 to every other copy of the distributed ledger 210 stored by the other nodes 202-208. Accordingly, the distributed ledger system 200 may be more robust than a central authority database system because of the decentralized nature of the distributed ledger 210, such that there is no single point of failure in the distributed ledger system 200 as there is in conventional centralized systems.

To illustrate, node A 202 may receive a transaction listing from a user or other entity indicative of an action (e.g., sale, maintenance, active/inactive insurance policy, etc.) corresponding to a vehicle that includes data corresponding to the user/entity. The transaction listing may also be or include a digital asset (e.g., NFT) that is associated with a virtual object (e.g., virtual representation of a vehicle, real property, home, antique, jewelry, or other personal belonging) in a virtual environment (e.g., Metaverse), and a status of the digital asset indicating an active association with the user or other entity. For example, the status of the digital asset may indicate that the real-world vehicle (or home or personal belonging) represented by the virtual object representing the vehicle is actively insured by a particular insurance provider (e.g., State Farm).

The digital asset may generally be an NFT minted on the distributed ledger 210, and the NFT may include and/or otherwise reference of a digital image, a digital audio file, an animated image, and/or any other suitable representation or combinations thereof. Further, the NFT may be disposed proximate to the virtual object representing the vehicle (or home or personal belonging) within the virtual environment in response to recording the transaction including the NFT in the distributed ledger 210. Therefore, and as discussed in reference to FIGS. 5A and 5C, a user accessing the virtual environment and viewing the virtual object representing the vehicle may also view the NFT (e.g., represented by the digital image, digital audio file, animated image, etc.), as a result of the NFT being disposed proximate to the virtual object within the virtual environment.

In any event, node A 202 may generate a transaction representing and/or otherwise based upon the transaction listing, and may tentatively upload the transaction to the distributed ledger 210. This uploaded transaction may be transmitted to each of the connected nodes 204-208, where each connected node 204-208 independently performs the calculations necessary to validate the authenticity of the transaction for recordation in the distributed ledger 210. Upon reaching a consensus among all nodes 202-208, the transaction corresponding to the vehicle may be officially recorded in the distributed ledger 210 and represented in all copies of the distributed ledger 210 in all connected nodes 202-208.

To provide a clearer understanding of the functionality of each node 202-208 in the distributed ledger system 200, FIG. 2B depicts exemplary components of a validating network node 220 on a distributed ledger system (e.g., distributed ledger system 200) for recording asset information. Generally speaking, the validating network node 220 may be or include components of the computing system 100 illustrated in FIG. 1. The validating network node 220 may include at least one processor 224, a memory 226, blockchain data 226a, smart contracts 226b, a communication module 228, a set of external ports 230, and a blockchain manager 232. Of course, the validating network node 220 may have additional or fewer components than described.

The validating network node 220 may generate a new block of transactions, and/or may broadcast transactions to other network nodes by using the blockchain manager 232. The blockchain data 226a stored in the memory 226 may be or include a state database of the distributed ledger (e.g., distributed ledger 106b, 210) for storing states of smart contracts deployed thereon, such that the blockchain manager 232 may reference the blockchain data 226a when broadcasting transactions to other network nodes. Similarly, the validating network node 220 may use the blockchain manager 232 in conjunction with the processor 224 and the smart contracts 226b stored in the memory 226 to execute some of the functionality disclosed herein related to generating and/or executing transactions for recordation in the distributed ledger.

In certain embodiments, the smart contracts 226b may operate independent of the blockchain manager 232 and/or other applications. For example, the smart contracts 226b may automatically execute in response to the satisfaction of a triggering condition (e.g., payment receipt), such that the processor 224 does not access and/or otherwise interact with the blockchain manager 232 when the triggering condition for the smart contract 226b is received and/or otherwise satisfied. In some embodiments, the validating network node 220 may not have a blockchain manager 232 or smart contracts 226b stored at the node 220, and these components may be stored in an external database/server or other connected nodes (e.g., external storage device 112, external computing device 116).

Exemplary Transaction Recordation in a Distributed Ledger

As mentioned, each n ode of a distributed ledger network/system may be involved in the consensus mechanism required to record transactions in the distributed ledger. To illustrate this concept, FIG. 3 depicts exemplary validating network nodes 302 and 304 and an exemplary transaction flow 300 on a distributed ledger network for resolving transactions. FIG. 3 includes two time frames 320 and 322 represented by the left and right sides of the dotted line, respectively, node A 302 and node B 304 (which may be part of the same distributed ledger network), a set of transactions 308A-308D, a set of transaction blocks 309A-309D, a distributed ledger 310, and a blockchain 318 within the distributed ledger 310.

The transaction flow 300 may begin with node A 302 receiving transaction 306 at time 320. For example, the transaction 306 may represent a vehicle sale, a vehicle obtaining insurance, and/or any other suitable action generally corresponding to the vehicle. When node A 302 confirms that transaction 306 is valid, node A 302 may add the transaction 306 to a newly generated block 308. As part of adding the transaction 306 to block 308, node A 302 may solve a cryptographic puzzle and include the solution in the newly generated block 308 as proof of the work done to generate the block 308. Alternatively, a proof of stake algorithm may be used to generate the block 308, whereby node A 302 "stakes" an amount of a digital token used on the network. In another embodiment, a proof of authority (PoA) algorithm may be used to generate the block 308, where transactions and blocks are validated by approved accounts, known as validators which run software allowing them to record transactions in the distributed ledger 310.

In other embodiments, the transaction 306 may be added to a pool of transactions until a sufficient number of transactions in the pool exist to form a block or distributed ledger entry. Node A 302 may transmit the newly created distributed ledger entry 308 to the network at time 312. Before or after propagating the newly generated block 308, node A 302 may add the newly generated block 308 to its copy of the distributed ledger 310.

While proof of work, proof of stake, and/or proof of authority are described herein as consensus algorithms for selecting a node to mint a new distributed ledger entry (e.g., newly generated block 308), these are merely a few example consensus algorithms and are not intended to be limiting. Additional consensus algorithms may be utilized, such as delegated proof of stake where nodes elect a subset of nodes referred to as delegates to perform validation, and the delegates take turns minting new distributed ledger entries. Consensus algorithms may also include proof of weight, Byzantine fault tolerance, such as practical and federated Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the set of transaction blocks 309A-309D may include updates to a state database 316. The state database 316 may contain current values of variables created by smart contracts deployed on the distributed ledger 310. Validated distributed ledger entries, such as the newly generated block 308, may include transactions effecting state variables in state database 316.

At time 322, node B 304 may receive the newly generated block 308 via the network at 312. Node B 304 may verify that the newly generated block 308 is valid by checking the solution to the cryptographic puzzle provided in the newly generated block 308. If the solution is accurate, then node B 304 may add the newly generated block 308 to its distributed ledger 310 and make any updates to the state database 316 as included in the transactions of the newly generated block 308. Node B 304 may then transmit the newly generated block 308 to the rest of the network at time 314.

More specifically, the newly generated block 308 may be linked to the other transaction blocks 309A-D in the blockchain 318 through various suitable methods. For example, to cryptographically link the newly generated block 308 to the set of transaction blocks 309A-D, the nodes 302, 304 may organize the transactions (e.g., 308A-D) of each block 308, 309A-D into a Merkle Tree. In a Merkle Tree, each transaction 308A-D may be hashed according to a cryptographic hashing algorithm (e.g., SHA-256), and the resulting output hash may then be combined with the hash of another transaction. The combined result may then also be hashed according to the cryptographic hashing algorithm. The hashed combined result may then be combined with the hash of two other transactions, and this process may be repeated until all of the transactions 308A-D in the newly generated block 308 are combined and hashed to generate a Merkle root that is used in the header for the newly generated block 308. If any transaction 308A-D in the newly generated block 308 is tampered with, a different Merkle root would be generated, as the Merkle root is a combination of the hashes of all of the transactions 308A-D in the newly generated block 308.

Simply put, the transactions 308A-D may be hashed using a cryptographic hash algorithm, and the hash of each transaction 308A-D may be stored in the tree. As the tree is constructed, the hash of each adjacent node at the same level may be hashed together to create a new node that exists at a higher level in the tree. Therefore, the node at the top of the tree (i.e., the Merkle root) may be dependent upon the hash of each transaction 308A-D stored below in the tree. Each transaction 308A-D may include a set of data, such as identifying data for the transaction and transaction data identifying the nature of the transaction and what the transaction entails (e.g., input and output addresses, a transaction value, a document hash value, a timestamp, a transaction fee value, etc.).

Thereafter, to verify that a block (e.g., newly generated block 308) is valid, a node may compare the Merkle root of the block 308 to the Merkle root for the same block 308 included in other nodes' copies of the blockchain 318. Therefore, the Merkle root can be used as proof of the transactions included in the newly generated block 308, and as proof that the contents of the newly generated block 308 have not been tampered with when the Merkle root is the same in each node's copy of the newly generated block 308.

Accordingly, in some embodiments, documents stored "on" the blockchain 318 may be documents that have been hashed according to a cryptographic hashing algorithm (e.g., SHA-256), and the resulting output hash has been included in a transaction 308A-D in a block 308 that has been accepted by the network nodes 302, 304 as satisfying the consensus rules of the blockchain 318. As such, the documents may be later verified or validated by comparing the hash of the documents to the hash stored on the blockchain 318. For example, if a set of documents results in a SHA-256 hash that was recorded on the blockchain 318 on a certain date, then the blockchain 318 may provide cryptographic proof that the documents existed as of that date.

Additionally, one way the nodes 302, 304 may store a document on the blockchain 318 is by broadcasting a transaction 308A-D including a hash of the document to the network, which may be included in the newly generated block 308 if the transaction 308A-D satisfies all of the consensus rules of the network. In some embodiments, only a cryptographic hash of the data may be included in the blockchain 318, such that the data may be verified using the blockchain 318 even if it is obtained by a party off-chain.

In some embodiments, a valid proof-of-identity may be applied as a consensus rule by the nodes (e.g., node A 302, node B 304) participating in the blockchain network of the blockchain 318. As such, any transaction 308A-D attempting to add new property information without a cryptographic proof-of-identity matching an identity authorized to add new property information is rejected by the nodes 304 validating new entries to the blockchain 318 as being non-compliant with the consensus rule. Each property owner may be assigned a public key/private key pair which is identified in the blockchain network as corresponding to the owner. If the validating network nodes receive a transaction regarding property information that is not from an authorized owner, the validating network nodes may reject the transaction. In certain embodiments, the consensus rules may also include a maximum transaction size, such that transactions in the respective blockchain network may not exceed the maximum transaction size.

FIG. 4 illustrates an exemplary transaction 406 recording identification information for an asset, along with minting an NFT that is associated with the asset, in a distributed ledger 402 of the distributed ledger 310 illustrated in FIG. 3. The transaction 406 may include a transaction ID and an originator such as John Doe who is the creator or original owner of the vehicle (identified by a cryptographic proof-of-identity). The transaction 406 may also include identification information for the asset, such as a brand name of the asset (MAKE A), a model of the asset (MODEL A), a description of the asset (Light grey 2015), a unique identification number for the vehicle such as a VIN or NFT, etc. In another example where the asset is a piece of artwork, the identification information may include the name of the artist or artists, the name of the art piece, the year created, materials used, the genre (e.g., impressionist), the weight, image file(s), dimensions, etc. Of course, it should be appreciated that the transaction 406 may include and/or otherwise reference any suitable information corresponding to the asset and/or the user/entity listing the transaction.

As illustrated in FIG. 4, the transaction 406 may mint an NFT associated the asset that is associated with the asset. For example, the NFT may include and/or otherwise reference properties of the asset, such as the identification information. In certain embodiments, the NFT may include a status that indicates an association between the asset and an entity. For example, the asset may be a vehicle, and the NFT may include a status indicating that the vehicle has an active insurance policy with a particular insurance provider (e.g., State Farm). Accordingly, the NFT may also be or include a visual representation (e.g., digital image) of a logo corresponding to the particular insurance provider, such that the visual representation may be visible in a virtual environment (e.g., Metaverse) when the NFT is disposed proximate to the virtual object representing the vehicle in the virtual environment. In any event, the NFT may be recorded in the distributed ledger 402 and may thereby be available for reference as part of the listed transaction. In certain embodiments, an NFT representing and/or otherwise corresponding to the asset may be obtained from an external system. The transaction may then record the obtained NFT in the distributed ledger 402.

Furthermore, the transaction 406 may include a cryptographic hash of the identification information. For example, the transaction 406 illustrated in FIG. 4 includes a cryptographic evidence hash that is stored in the distributed ledger 402 as part of the transaction 406. In some embodiments, the identification information may not be stored as a cryptographic hash, but may be directly accessible in block 404 by an observer or other network participant.

To facilitate the sale of assets and ensure transparency in transactions involving these assets, the nodes (e.g., node A 302, node B 304) that participate in the validation/consensus mechanism for a distributed ledger (e.g., distributed ledger 402) may generate and display user interfaces on client devices of users. A client device may be a smart phone, a tablet, a laptop computer, a desktop computer, a wearable device such as a smart watch or smart glasses, augmented reality glasses, virtual reality headset, etc. The client devices may communicate directly with a distributed ledger, such as the distributed ledger 402 as shown in FIG. 4. In other embodiments, a server device may connect to and/or otherwise monitor the distributed ledger 402, obtain transaction information from the distributed ledger 402, and may provide the transaction information to a client device for display to the user. Therefore, in certain embodiments, the client device may be a node connecting directly to the distributed ledger 402, and in other embodiments, the client device may connect to a node that is connected to the distributed ledger 402. FIGS. 5A-5D illustrate exemplary user interfaces and virtual experiences which may be presented to users on such client devices.

Exemplary User Interfaces and Virtual Experiences

In particular, FIG. 5A illustrates an exemplary digital asset minting transaction and upload sequence 500 to a virtual environment 506 for viewing by a user 510 in the virtual environment 506, in accordance with various embodiments herein. The exemplary digital asset minting transaction and upload sequence 500 generally includes a transaction 504C1 that includes a digital asset associated with a virtual object 507 being recorded on a distributed ledger 502 at a first time 501, and a representation of the digital asset 508 being disposed proximate to a virtual object 507 in the virtual environment 506 at a second time 505. When the digital asset 508 and/or representation thereof is disposed proximate to the virtual object 507, a user 510 may access the virtual environment 506 (e.g., via a virtual reality (VR) headset 512) to view the virtual object 507 and the digital asset 508.

In any event, a node (e.g., node A 302, node B 304) may generate the transaction 504C1 based on a transaction listing that includes, for example, the digital asset 508 associated with the virtual object 507. The node may mint the digital asset 508 by successfully recording the transaction 504C1 in the distributed ledger 502, such that at the second time 505, the digital asset 508 may be uploaded to the virtual environment 506 and displayed proximate to the virtual object 507 in the virtual environment 506. Therefore, at the first time 501, the digital asset 508 may not be disposed proximate to the virtual object 507. In certain embodiments, the digital asset 508 may only be disposed proximate to the virtual object 507 after the digital asset 508 is minted in the distributed ledger 502.

Of course, as discussed further herein, transactions (e.g., transaction 504C1) corresponding to the digital asset 508 may be or include a status or status update for the digital asset 508. In this manner, the digital asset 508 may display updated and/or different information to a user 510 viewing the digital asset 508 in the virtual environment 506 after the transaction including the status or status update is recorded to the distributed ledger 502 in any of the blocks 502A, 502B, 502C as any one or more of the transactions 504A, 504B, 504C included therein. It should be understood that N may be any integer, such that the distributed ledger 502 may include any suitable number of blocks 502A-C, and each block 502A-C may include any suitable number of transactions 504A-C, 504C1.

A Metaverse hosting server (not shown) and/or other suitable device may access the distributed ledger 502 (e.g., by providing authorizing credentials corresponding to a user/entity), and may retrieve the transaction information corresponding to the current status of the digital asset 508. Using the transaction information, the hosting server may identify and locate the virtual object 507 indicated by the digital asset 508 and/or otherwise indicated in the transaction information, and may dispose the digital asset 508 proximate to the virtual object 507. In some embodiments, the hosting server may analyze the information included in the transaction to determine a user associated with the digital asset 508, and may then identify a virtual object 507 and/or real-world object owned and/or otherwise associated with the user to dispose the digital asset 508 proximate to the virtual object 507.

As mentioned, the exemplary digital asset minting transaction and upload sequence 500 also depicts the user 510 utilizing the VR headset 512 to view the virtual environment 506, such as the Metaverse. In the exemplary digital asset minting transaction and upload sequence 500, the user 510 may access the virtual environment 506 at the second time 505, such that the digital asset 508 is disposed proximate to the virtual object. At the second time 505, the digital asset 508 may indicate that the virtual object 507 and/or the real-world object represented by the virtual object 507 has an active insurance policy from an insurance provider. Therefore, the user 510 may access the virtual environment 506, view the digital asset 508 disposed proximate to the virtual object 507 in the virtual environment 506, and may view the current status of the digital asset 508 to thereby recognize that the virtual object 507 and/or the real-world object represented by the virtual object 507 has an active insurance policy from an insurance provider.

The transaction 504C1 recorded into the distributed ledger 502 may include some/all of the information included in the transaction listing supplied to the node that generated and/or recorded the transaction 504C1. When this information is integrated into a recorded transaction 504C1, the Metaverse hosting server may retrieve this information for inclusion as part of a listing associated with the virtual object 507. For example, FIG. 5B depicts an exemplary display 520 showing the newly minted digital asset 522 (e.g., digital asset 508) from FIG. 5A, and a corresponding status, in accordance with various embodiments herein. The exemplary display 520 may be presented, for example, on a user's client device.

The display 520 may include general information corresponding to the asset 507, such as an asset type (vehicles), a current status (e.g., "ACTIVE") of the digital asset 522 associated with the asset 507, a name or other identification information for the asset, a detailed description of the asset, a number of previous owners of asset, an image of the asset, and/or any other information or files. When the hosting server or other suitable device generates this display 520 for viewing by users in the virtual environment (e.g., virtual environment 506), another user (e.g., user 510) may approach the virtual object 507 and view the display 520.

The digital asset 522 included in the display 520 may be and/or be represented as a digital image, a sound file with which a user may interact (e.g., click, tap, swipe, verbal command, etc.) to receive the corresponding sound, and animated image that may include animations or other series/sequences of images, or the like. For example, the digital asset 522 may be or be represented as a logo of an insurance provider (e.g., State Farm) that provides the insurance for the vehicle represented in the display 520. In this example, the status indication in the display 520 may correspond to whether or not the insurance policy issued by the insurance provider is currently active for the vehicle (real-world and/or virtual) represented in the display 520. In some embodiments, an entity device (e.g., an insurance provider device) may generate and transmit a transaction to the distributed ledger (e.g., distributed ledger 502), for example, to update the status of the digital asset associated with the virtual object (e.g., virtual object 507). The hosting server may receive this updated status, and may update the display 520 to include the updated status of the digital asset.

Additionally, the hosting server may obtain transaction information from a distributed ledger, such as the distributed ledger 502 as shown in FIG. 5A, and the hosting server may provide this transaction information for assets associated with a particular user to the particular user's client device. For example, the user may be assigned a cryptographic public key or address in the distributed ledger network. The hosting server may monitor the distributed ledger for transactions including the user's cryptographic public key or address to obtain the transaction information (e.g., status updates for digital assets) for the assets associated with the user.

To illustrate, FIG. 5C depicts an exemplary updated transaction 540 (also referenced herein as a "subsequent transaction") related to the digital asset 508 of FIG. 5A and an upload sequence to the virtual environment 506 for viewing by a user 510 in the virtual environment 506, in accordance with various embodiments herein. The exemplary updated transaction 540 generally includes an updated transaction 544A1 that includes an updated status for the digital asset 508 of FIG. 5A associated with the virtual object 507 being recorded on a distributed ledger 502 at a first time 541, and a representation of an updated digital asset 546 being disposed proximate to the virtual object 507 in the virtual environment 506 at a second time 545. When the updated digital asset 546 and/or representation thereof is disposed proximate to the virtual object 507, a user 510 may access the virtual environment 506 (e.g., via a virtual reality (VR) headset 512) to view the virtual object 507 and the updated digital asset 546.

A node (e.g., node A 302, node B 304) may generate the transaction 544A1 based on a subsequent transaction listing that includes, for example, an updated status for the digital asset 508 of FIG. 5A that is associated with the virtual object 507. The node may record the transaction 544A1 in the distributed ledger 502, such that at the second time 545, the updated digital asset 546 may be uploaded to the virtual environment 506 and displayed proximate to the virtual object 507 in the virtual environment 506. Therefore, at the first time 541, the digital asset 508 of FIG. 5A may be disposed proximate to the virtual object 507, and the updated digital asset 546 may only be disposed proximate to the virtual object 507 after the subsequent transaction 544A1 is recorded in the distributed ledger 502. It should be understood that N and M may be any integers, such that the distributed ledger 502 may include any suitable number of blocks 502A-C, 542A, and each block 502A-C, 542A may include any suitable number of transactions 504A-C, 504C1, 544A, 544A1.

A Metaverse hosting server (not shown) and/or other suitable device may access the distributed ledger 502 (e.g., by providing authorizing credentials corresponding to a user/entity), and may retrieve the transaction information corresponding to the updated status of the digital asset 508. Using the transaction information, the hosting server may identify and locate the virtual object 507 indicated by the updated digital asset 546 and/or otherwise indicated in the transaction information, and may dispose the updated digital asset 546 proximate to the virtual object 507. In some embodiments, the hosting server may analyze the information included in the transaction to determine a user associated with the updated digital asset 546, and may then identify a virtual object 507 and/or real-world object owned and/or otherwise associated with the user to dispose the updated digital asset 546 proximate to the virtual object 507.

As mentioned, the exemplary digital asset minting transaction and upload sequence 500 also depicts the user 510 utilizing the VR headset 512 to view the virtual environment 506, such as the Metaverse. In the exemplary digital asset minting transaction and upload sequence 500, the user 510 may access the virtual environment 506 at the second time 545, such that the updated digital asset 546 is disposed proximate to the virtual object. At the second time 545, the updated digital asset 546 may indicate that the virtual object 507 and/or the real-world object represented by the virtual object 507 has an inactive insurance policy from an insurance provider. Therefore, the user 510 may access the virtual environment 506, view the updated digital asset 546 disposed proximate to the virtual object 507 in the virtual environment 506, and may view the updated status of the updated digital asset 546 to thereby recognize that the virtual object 507 and/or the real-world object represented by the virtual object 507 has an inactive insurance policy from an insurance provider.

Accordingly, in some embodiments, the hosting server and/or other suitable device may change the status of the digital asset 508 of FIG. 5A to reflect the updated status included in the subsequent transaction 544A1, and may change an appearance of the digital asset 508 to reflect the updated status when the updated digital asset 546 is disposed proximate to the virtual object 507. For example, the hosting server, the node generating and/or recording the transaction, and/or any other suitable device or combinations thereof may alter the digital image, sound file, animated image, and/or other suitable displayed qualities of the digital asset 508 of FIG. 5A in response to the updated status. The alterations may be or include a greying out of a logo representative of an insurance provider, an inability to play the audio recording, no animation sequence playing upon viewing of the animated image, and/or any other suitable alteration to the appearance of the digital asset within the virtual environment 506 when viewed by a user 510 in the virtual environment 506.

To better illustrate what a user 510 may see when viewing the virtual object 507 and/or the updated digital asset 546 within the virtual environment 506, FIG. 5D illustrates an exemplary display 560 showing the updated status of the digital asset 546 from FIG. 5C, in accordance with various embodiments herein. In particular, the exemplary display 560 includes an updated rendering and/or representation of the digital asset 562 that includes a crossed-out circle indicating that the digital asset has an inactive status. The inactive status may indicate, for example, that the corresponding asset (e.g., real-world and/or virtual vehicle) may have a vehicle insurance policy that has been cancelled, has lapsed, and/or that the corresponding asset is otherwise currently uninsured.

In certain embodiments, the updated rendering and/or representation of the digital asset 562 may include the representation of the digital asset 522 in FIG. 5B when the status was "ACTIVE", but the representation may be crossed-out by the crossed-out circle, greyed out, and/or otherwise de-emphasized. In this manner, the de-emphasized representation of the digital asset 522 of FIG. 5B in the updated rendering and/or representation of the digital asset 562 may indicate that, for example, a particular insurance provider previously insured the asset, but does not currently. As another example, the updated status (i.e., "INACTIVE") of the digital asset may indicate that the asset (vehicle) is overdue for maintenance. Accordingly, the de-emphasized representation of the digital asset 522 of FIG. 5B in the updated rendering and/or representation of the digital asset 562 may indicate that, for example, a particular maintenance provider previously repaired/serviced the vehicle, but has not recently.

Exemplary Transaction Requests Corresponding to Digital Assets

As previously mentioned, in addition to the digital assets being displayed in connection with a virtual object in a virtual environment, a user may receive special transactions, discounts, and/or other incentives based upon digital assets stored in a distributed ledger (e.g., distributed ledger 502). FIGS. 6A and 6B depict transaction requests that are approved or denied based on a current status of a digital asset recorded in a distributed ledger, in accordance with various embodiments herein.

For example, FIG. 6A illustrates a first transaction request scenario 600 that includes a user computing device 602 communicating with a node 604 storing a copy of a distributed ledger 606. The user computing device 602 may transmit a transaction request to the node 604, the node 604 may evaluate the transaction request by retrieving and/or analyzing entries in the distributed ledger 606, and the node 604 may return an approval/rejection determination to the user computing device 602 based on the analysis of entries in the distributed ledger 606.

Generally, the user computing device 602 may correspond to and/or otherwise belong to a user/entity that owns an asset that is serviced in some manner by the entity that owns and/or otherwise manages the node 604. For example, the user computing device 602 may belong to an individual that owns a vehicle that is insured by an insurance provider that owns/operates the node 604. The insurance provider may offer incentives for users that maintain vehicle insurance policies for certain periods of time (e.g., 1 year, 5 years, 10 years, etc.), and as part of maintaining an active insurance policy with the insurance provider, a user may be able to request discounted rates for other items/policies offered by the insurance provider and/or other associated vendors.

For example, the user may submit a transaction request for a discount related to merchandise that is associated with the insurance provider and/or a participating vendor, and this transaction request may be received at the node 604 of the insurance provider. The transaction request may include basic information about the user, such as the user's name, an asset owned by the user and insured by the insurance provider, a transaction ID corresponding to a recorded transaction that includes the most recent status update for digital asset representing the user's insurance policy for the asset, and/or other suitable information. The insurance provider node 604 may search the distributed ledger 606 to retrieve the corresponding transaction, analyze the transaction to determine the most recent status update for the digital asset, and may transmit the approval/rejection determination to the user computing device 602 accordingly.

In a first example, the user may have an active status associated with the digital asset representing a user's insurance policy for their vehicle. In this first example, the user may access a website, a virtual store (e.g., in the Metaverse), and/or a real-world store associated with the insurance company, and the user may desire to purchase merchandize or other goods/services offered by the insurance company and/or participating vendors via the website, virtual store, and/or the real-world store. The user may attempt to purchase the merchandize, and may be prompted to submit a transaction request if the user is a customer of the insurance company and/or a participating vendor.

Accordingly, in the first example, the user may submit (via the user computing device 602) a transaction request for approval of a discounted rate for merchandize offered by the insurance provider that manages the node 604. The node 604 may analyze the distributed ledger 606 to determine a most recent transaction that includes a status update for the digital asset corresponding to the user's insurance policy for their vehicle. The node 604 may locate a most recent transaction indicating that the digital asset has an "ACTIVE" current status, such that the user may be approved for a discounted rate on merchandize and/or other goods/services offered by the insurance company and/or participating vendors. The node 604 may then transmit an approval determination back to the user computing device 602, and the user may obtain a discounted rate corresponding to the merchandize or other goods/services offered by the insurance company and/or participating vendors via the website, virtual store, and/or the real-world store.

In a second example, the user may have an inactive status associated with the digital asset representing a user's insurance policy for their vehicle. In this second example, the user may access a website, a virtual store (e.g., in the Metaverse), and/or a real-world store associated with the insurance company, and the user may desire to purchase merchandize or other goods/services offered by the insurance company and/or participating vendors via the website, virtual store, and/or the real-world store. The user may attempt to purchase the merchandize, and may be prompted to submit a transaction request if the user is a customer of the insurance company and/or a participating vendor.

Accordingly, in the second example, the user may submit (via the user computing device 602) a transaction request for approval of a discounted rate for merchandize offered by the insurance provider that manages the node 604. The node 604 may analyze the distributed ledger 606 to determine a most recent transaction that includes a status update for the digital asset corresponding to the user's insurance policy for their vehicle. The node 604 may locate a most recent transaction indicating that the digital asset has an "INACTIVE" current status, such that the user may be rejected for a discounted rate on merchandize and/or other goods/services offered by the insurance company and/or participating vendors. The node 604 may then transmit a rejection determination back to the user computing device 602, and the user may not obtain a discounted rate corresponding to the merchandize or other goods/services offered by the insurance company and/or participating vendors via the website, virtual store, and/or the real-world store.

Of course, in certain embodiments, the user may purchase and/or otherwise interact with participating vendors that may independently check with the node 604 to determine whether or not to provide the user with discounts and/or other incentives as part of a customer loyalty or other similar program. For example, FIG. 6B illustrates a second transaction request scenario 620 that includes the user computing device 602 scanning an indicia 622 (e.g., a quick response (QR) code) to thereby transmit a transaction request to a connected device 624. The connected device 624 may transmit a check request to the node 604 storing the copy of the distributed ledger 606, and the node 604 may evaluate the check request by retrieving and/or analyzing entries in the distributed ledger 606. The node 604 may return a digital asset status to the connected device 624, and the connected device 624 may then determine whether or not to provide alternative interaction options to the user computing device 602 based on analysis of the digital asset status. These alternative interaction options may be or include various benefits, offers, and/or other options corresponding to goods/services offered by the participating vendor.

As an example, the connected device 624 may be or include a device that is operated by a vendor or other entity that is participating as part of an incentive program that is organized by the entity operating the node 604. The vendor or other entity may provide benefits, offers, and/or other options to users that satisfy status conditions of digital assets stored in the distributed ledger.

For example, the connected device 624 may be a server and/or other computing device operated by a restaurant visited by the user. The user may scan the indicia 622 at a table or checkout station of the restaurant using the user computing device 602, and in response to scanning the indicia, the device 602 may transmit a transaction request to the connected device 624. The transaction request may be or include a username (or user name), ID, a hash value, and/or any other suitable value or combinations thereof, such that the connected device 624 may transmit the check request to the node 604, and the node 604 may retrieve a transaction from the distributed ledger 606 that includes a most recent status update for a digital asset associated with an asset owned by the user. The node 604 may transmit the digital asset status to the connected device 624, and the connected device 624 may determine that the user is eligible for an offer, incentives, and/or other alternative interaction options. In this example, the user may receive optional discounts on a restaurant bill, offers for free menu items, coupons for return visits, or the like.

In certain embodiments, the user computing device 602 may communicate directly with the node 604. In these embodiments, the user computing device 602 may scan the indicia 622, transmit a transaction request directly to the node 604, and the user computing device and/or the node 604 may transmit the digital asset status to the connected device 624. The connected device 624 may then determine whether or not to provide the user with alternative interaction options. Moreover, while generally described herein as taking place in real-world environments (e.g., a restaurant), it should be understood that the first and second transaction request scenarios 600, 620 may occur in virtual environments (e.g., virtual environment 506) as well.

Exemplary Method for Marking Virtual Objects

FIG. 7 is a block diagram of an exemplary computer-implemented method 700 for marking virtual objects, in accordance with various embodiments herein. Generally speaking, any of the actions described herein in reference to the exemplary method 700 may be performed by a node (e.g., nodes 202-208, 302, 304, 604), a server device, a user computing device (e.g., user computing device 602), and/or any combinations thereof.

The method 700 may include receive a transaction listing from a first entity (block 702). The transaction listing may include (i) a digital asset that is associated with a virtual object in a virtual environment and (ii) a status of the digital asset indicating an active association with the first entity. In certain embodiments, the digital asset is a non-fungible token (NFT) minted on the distributed ledger, and the NFT may include or be representative of at least one of: (i) a digital image, (ii) a digital audio file, or (iii) an animated image. In some embodiments, the virtual object corresponds to a real-world object that is owned by a second entity, and the status of the digital asset corresponds to a current status of the real-world object.

For example, the virtual object (e.g., virtual object 507) may appear within a virtual environment (e.g., virtual environment 506) as a vehicle that a user owns, uses, and/or is otherwise associated, as represented in a transaction recorded on the distributed ledger (e.g., distributed ledger 502). More specifically, the virtual object may represent a real-world vehicle that the user owns, uses, and/or is otherwise associated with in the real-world outside of a virtual environment. However, it should be understood that the virtual object appearing within the virtual environment as a vehicle, and the real-world object/asset to which it corresponds being a vehicle, is simply for the purposes of discussion. The virtual object may appear within the virtual environment as any suitable object, such as valuable personal property (e.g., jewelry, electronics, firearms, art, etc.), real property (e.g., a user's home, a user's other real estate), as well as vehicles, and/or other suitable objects or combinations thereof. Accordingly, the virtual object may also represent any suitable real-world objects, such as the valuable personal property, real property, vehicles, and/or any other suitable objects or combinations thereof.

Moreover, transactions recorded in the distributed ledger may also include and/or mint a digital asset (e.g., digital asset 508) that corresponds to any of these suitable objects. For example, a transaction including a digital asset corresponding to a piece of valuable personal property (e.g., jewelry, electronics, firearms, art, etc.) may be recorded on the distributed ledger. As a result of recording the transaction on the distributed ledger, the digital asset may be disposed proximate to the virtual object representing the valuable personal property in the virtual environment. Therefore, when a user accesses the virtual environment to view the virtual object appearing as the piece of valuable personal property, the user may view the digital asset disposed proximate to the virtual object. While viewing the digital asset, the user may verify, for example, that the valuable personal property is currently being repaired, actively insured, and/or any other suitable status, as part of the transaction recorded on the distributed ledger.

As another example, the a transaction including a digital asset corresponding to a piece of real property (e.g., a user's home, a user's other real estate, etc.) may be recorded on the distributed ledger. As a result of recording the transaction on the distributed ledger, the digital asset may be disposed proximate to the virtual object representing the real property in the virtual environment. Therefore, when a user accesses the virtual environment to view the virtual object appearing as the real property, the user may view the digital asset disposed proximate to the virtual object. While viewing the digital asset, the user may verify, for example, that the real property is currently being repaired, actively insured, and/or any other suitable status, as part of the transaction recorded on the distributed ledger.

The method 700 may further include generating a transaction based upon the transaction listing (block 704). The transaction may include an indication of the virtual object. The method 700 may further include recording the transaction in a distributed ledger (block 706). The method 700 may further include, responsive to recording the transaction in the distributed ledger, causing the status of the digital asset to be displayed when the virtual object is viewed in the virtual environment.

In certain embodiments, responsive to recording the transaction in the distributed ledger, the method 700 may further include causing the digital asset to be disposed proximate to the virtual object within the virtual environment.

In some embodiments, the method 700 may further include receiving a subsequent transaction listing from the first entity. The subsequent transaction listing may include an updated status of the digital asset indicating an inactive association with the first entity. Further in these embodiments, the method 700 may include generating a subsequent transaction including a description of the subsequent transaction listing, and recording the subsequent transaction in the distributed ledger.

In certain embodiments, the method 700 may further include receiving a transaction request from a second entity that owns the virtual object. In these embodiments, the method 700 may further include determining the status of the digital asset through the transaction recorded on the distributed ledger, and determining whether to approve or deny the transaction request based upon the status of the digital asset.

In certain embodiments, the status of the digital asset may indicate an active association with the first entity, and the status of the digital asset may cause a second entity that owns the virtual object to obtain alternative interaction options in the virtual environment based upon the status of the digital asset. In some embodiments, the status of the digital asset may indicate an active association with the first entity, and the status of the digital asset may cause a second entity that owns the virtual object to obtain alternative interaction options in a real-world environment based upon the status of the digital asset. The method may include additional, less, or alternate actions, including those discussed elsewhere herein.

ADDITIONAL CONSIDERATIONS

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

The systems and methods described herein are directed to an improvement to computer functionality, and improve the functioning of conventional computers. Additionally, certain embodiments are described herein as including logic or a number of routines, subroutines, applications, or instructions. These may constitute either software (e.g., code embodied on a non-transitory, machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC)) to perform certain operations. A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules include a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of locations.

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment is included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still cooperate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also may include the plural unless it is obvious that it is meant otherwise.

This detailed description is to be construed as examples and does not describe every possible embodiment, as describing every possible embodiment would be impractical, if not impossible. One could implement numerous alternate embodiments, using either current technology or technology developed after the filing date of this application.

Upon reading this disclosure, those of skill in the art will appreciate still additional alternative structural and functional designs for evaluation properties, through the principles disclosed herein. Therefore, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer system for marking virtual objects, the computer system comprising:
   one or more processors; and
   a non-transitory computer-readable medium coupled to the one or more processors and storing instructions thereon, that when executed by the one or more processors, causes the one or more processors to:
   receive a transaction listing from a first entity, the transaction listing including (i) a digital asset that is associated with a virtual object in a virtual environment and (ii) a status of the digital asset indicating an active association with the first entity, wherein the status of the digital asset causes a second entity that owns the virtual object to obtain alternative interaction options in at least one of: (i) the virtual environment or (ii) a real-world environment based upon the status of the digital asset,
   generate a transaction based upon the transaction listing, the transaction including an indication of the virtual object, record the transaction in a distributed ledger,
responsive to recording the transaction in the distributed ledger, cause the status of the digital asset to be displayed when the virtual object is viewed in the virtual environment,
receive a transaction request from the second entity that owns the virtual object,
determine the status of the digital asset through the transaction recorded on the distributed ledger, and
determine whether to approve or deny the transaction request based upon the status of the digital asset.

2. The computer system of claim 1, wherein the instructions, when executed, further cause the one or more processors to:
responsive to recording the transaction in the distributed ledger, cause the digital asset to be disposed proximate to the virtual object within the virtual environment.

3. The computer system of claim 1, wherein the instructions, when executed, further cause the one or more processors to:
receive a subsequent transaction listing from the first entity, the subsequent transaction listing including an updated status of the digital asset indicating an inactive association with the first entity;
generate a subsequent transaction including a description of the subsequent transaction listing; and
record the subsequent transaction in the distributed ledger.

4. The computer system of claim 1, wherein the digital asset is a non-fungible token (NFT) minted on the distributed ledger, the NFT including at least one of: (i) a digital image, (ii) a digital audio file, or (iii) an animated image.

5. The computer system of claim 1, wherein the virtual object corresponds to a real-world object that is owned by a second entity, and the status of the digital asset corresponds to a current status of the real-world object.

6. The computer system of claim 1, wherein the status of the digital asset indicating an active association with the first entity causes a second entity that owns the virtual object to obtain alternative interaction options in the virtual environment based upon the status of the digital asset.

7. The computer system of claim 1, wherein the status of the digital asset indicating an active association with the first entity causes a second entity that owns the virtual object to obtain alternative interaction options in a real-world environment based upon the status of the digital asset.

8. A computer-implemented method for marking virtual objects, the method comprising:
receiving, at one or more processors, a transaction listing from a first entity, the transaction listing including (i) a digital asset that is associated with a virtual object in a virtual environment and (ii) a status of the digital asset indicating an active association with the first entity, wherein the status of the digital asset causes a second entity that owns the virtual object to obtain alternative interaction options in at least one of: (i) the virtual environment or (ii) a real-world environment based upon the status of the digital asset;
generating, by the one or more processors, a transaction based upon the transaction listing, the transaction including an indication of the virtual object;
recording, by the one or more processors, the transaction in a distributed ledger;
responsive to recording the transaction in the distributed ledger, causing, by the one or more processors, the status of the digital asset to be displayed when the virtual object is viewed in the virtual environment;
receiving, at the one or more processors, a transaction request from the second entity that owns the virtual object;
determining, by the one or more processors, the status of the digital asset through the transaction recorded on the distributed ledger; and
determining, by the one or more processors, whether to approve or deny the transaction request based upon the status of the digital asset.

9. The computer-implemented method of claim 8, further comprising:
responsive to recording the transaction in the distributed ledger, causing, by the one or more processors, the digital asset to be disposed proximate to the virtual object within the virtual environment.

10. The computer-implemented method of claim 8, further comprising:
receiving, at the one or more processors, a subsequent transaction listing from the first entity, the subsequent transaction listing including an updated status of the digital asset indicating an inactive association with the first entity;
generating, by the one or more processors, a subsequent transaction including a description of the subsequent transaction listing; and
recording, by the one or more processors, the subsequent transaction in the distributed ledger.

11. The computer-implemented method of claim 8, wherein the digital asset is a non-fungible token (NFT) minted on the distributed ledger, the NFT including at least one of: (i) a digital image, (ii) a digital audio file, or (iii) an animated image.

12. The computer-implemented method of claim 8, wherein the virtual object corresponds to a real-world object that is owned by a second entity, and the status of the digital asset corresponds to a current status of the real-world object.

13. A tangible, non-transitory computer-readable medium storing instructions for marking virtual objects that, when executed by one or more processors of a computing device, cause the computing device to:
receive a transaction listing from a first entity, the transaction listing including (i) a digital asset that is associated with a virtual object in a virtual environment and (ii) a status of the digital asset indicating an active association with the first entity, wherein the status of the digital asset indicating an active association with the first entity causes a second entity that owns the virtual object to obtain alternative interaction options in at least one of: (i) the virtual environment or (ii) a real-world environment based upon the status of the digital asset;
generate a transaction based upon the transaction listing, the transaction including an indication of the virtual object;
record the transaction in a distributed ledger; and
responsive to recording the transaction in the distributed ledger, cause the status of the digital asset to be displayed when the virtual object is viewed in the virtual environment;
receive a transaction request from the second entity that owns the virtual object;
determine the status of the digital asset through the transaction recorded on the distributed ledger; and
determine whether to approve or deny the transaction request based upon the status of the digital asset.

14. The tangible, non-transitory computer-readable medium of claim 13, wherein the instructions, when executed, further cause the computing device to:

responsive to recording the transaction in the distributed ledger, cause the digital asset to be disposed proximate to the virtual object within the virtual environment.

15. The tangible, non-transitory computer-readable medium of claim 13, wherein the instructions, when executed, further cause the computing device to:

receive a subsequent transaction listing from the first entity, the subsequent transaction listing including an updated status of the digital asset indicating an inactive association with the first entity;

generate a subsequent transaction including a description of the subsequent transaction listing; and record the subsequent transaction in the distributed ledger.

16. The tangible, non-transitory computer-readable medium of claim 13, wherein the virtual object corresponds to a real-world object that is owned by a second entity, and the status of the digital asset corresponds to a current status of the real-world object.

\* \* \* \* \*